(12) United States Patent
Radovinsky et al.

(10) Patent No.: US 12,555,711 B2
(45) Date of Patent: Feb. 17, 2026

(54) TECHNIQUES FOR DISTRIBUTING FORCES IN HIGH FIELD MAGNETS AND RELATED SYSTEMS AND METHODS

(71) Applicants: Massachusetts Institute of Technology, Cambridge, MA (US); Commonwealth Fusion Systems LLC, Devens, MA (US)

(72) Inventors: Alexey Radovinsky, Cambridge, MA (US); Alexander Zhukovsky, Brighton, MA (US); Nicholas J. Kelton, Somerville, MA (US); Sergey Kuznetsov, Attleboro, MA (US); Daniel Nash, Somerville, MA (US); Charlie Sanabria, Shirley, MA (US); Brian Labombard, Belmont, MA (US); Daniel Brunner, Savannah, GA (US); Grant William Kristofek, Wayland, MA (US)

(73) Assignees: Massachusetts Institute of Technology, Cambridge, MA (US); Commonwealth Fusion Systems LLC, Devens (MA)

( * ) Notice: Subject to any disclaimer, the term of this patent is extended or adjusted under 35 U.S.C. 154(b) by 300 days.

(21) Appl. No.: 17/919,606

(22) PCT Filed: May 20, 2021

(86) PCT No.: PCT/US2021/033349
§ 371 (c)(1),
(2) Date: Oct. 18, 2022

(87) PCT Pub. No.: WO2021/236901
PCT Pub. Date: Nov. 25, 2021

(65) Prior Publication Data
US 2023/0162900 A1     May 25, 2023

Related U.S. Application Data

(60) Provisional application No. 63/027,552, filed on May 20, 2020.

(51) Int. Cl.
*H01F 6/06*     (2006.01)
*H01F 6/02*     (2006.01)
(Continued)

(52) U.S. Cl.
CPC .............. *H01F 6/06* (2013.01); *H01F 6/02* (2013.01); *H01F 6/04* (2013.01); *H01F 41/048* (2013.01); *H01F 41/074* (2016.01)

(58) Field of Classification Search
CPC ..... H01F 6/06; H01F 6/02; H01F 6/04; H01F 41/048; H01F 41/074
See application file for complete search history.

(56) References Cited

U.S. PATENT DOCUMENTS

| 1,955,318 A | 4/1934 | West |
| 2,982,889 A | 5/1961 | Whearley |
(Continued)

FOREIGN PATENT DOCUMENTS

| CA | 2 304 633 | 4/1998 |
| CA | 2 374 326 A1 | 1/2001 |
(Continued)

OTHER PUBLICATIONS

U.S. Appl. No. 17/796,481, filed Jul. 29, 2022, Radovinsky, et al.
(Continued)

*Primary Examiner* — Mohamad A Musleh
(74) *Attorney, Agent, or Firm* — Daly, Crowley, Mofford & Durkee, LLP

(57) ABSTRACT

Techniques are described for lowering strains applied to superconducting material in a superconducting magnet by arranging structural partitions between turns of the super-
(Continued)

conducting material that intercept and transfer strain to a mechanically stronger structure, such as the housing of the magnet. A structural partition may be formed with a feed-through slit so that the superconducting material can easily pass through the partition. A number of structural partitions may be interspersed between groups of turns of superconducting material in a magnet so that forces can be sufficiently distributed by the partitions throughout the magnet. At the same time, the number of structural partitions may be selected to minimize the amount of space within the magnet occupied by the partitions that could otherwise be occupied by current-carrying superconducting material.

23 Claims, 17 Drawing Sheets

(51) Int. Cl.
*H01F 6/04* (2006.01)
*H01F 41/04* (2006.01)
*H01F 41/074* (2016.01)

(56) References Cited

U.S. PATENT DOCUMENTS

| | | | |
|---|---|---|---|
| 3,210,610 A | 10/1965 | Fraser | |
| 3,281,738 A | 10/1966 | Hanak | |
| 3,293,008 A | 12/1966 | Allen et al. | |
| 3,416,111 A | 12/1968 | Bogner | |
| 3,428,925 A | 2/1969 | Bogner et al. | |
| 3,919,677 A | 11/1975 | Young | |
| 3,983,521 A | 9/1976 | Furuto et al. | |
| 4,135,294 A | 1/1979 | Brown | |
| 4,218,668 A | 8/1980 | Tada et al. | |
| 4,344,807 A | 8/1982 | Dennesen | |
| 4,377,905 A | 3/1983 | Agatsuma et al. | |
| 4,586,012 A | 4/1986 | Koizumi et al. | |
| 5,122,772 A | 6/1992 | Shimamoto et al. | |
| 5,231,078 A | 7/1993 | Riebman et al. | |
| 5,331,800 A | 7/1994 | Schaumburg et al. | |
| 5,426,408 A | 6/1995 | Jones et al. | |
| 5,719,106 A | 2/1998 | Koji et al. | |
| 5,902,774 A | 5/1999 | Koji et al. | |
| 5,914,647 A | 6/1999 | Aized et al. | |
| 6,194,985 B1 | 2/2001 | Tanaka et al. | |
| 6,231,078 B1 | 5/2001 | Kokeguchi | |
| 6,271,474 B1 | 8/2001 | Fujikami et al. | |
| 6,472,966 B1 | 10/2002 | Ehrhart | |
| 6,576,843 B1 | 6/2003 | Ashworth | |
| 6,601,289 B1 | 8/2003 | Kobayashi | |
| 8,344,843 B2 * | 1/2013 | Larsen | H01F 30/06 336/224 |
| 8,437,819 B2 | 5/2013 | Takayasu et al. | |
| 9,183,970 B2 | 11/2015 | Maeda et al. | |
| 9,324,486 B2 * | 4/2016 | Hahn | H01F 6/00 |
| 9,697,930 B2 | 7/2017 | Takemoto | |
| 10,062,485 B2 | 8/2018 | Iwasa et al. | |
| 10,079,092 B2 | 9/2018 | Iwasa et al. | |
| 10,319,500 B2 | 6/2019 | Ko et al. | |
| 10,332,640 B2 | 6/2019 | Sykes et al. | |
| 10,804,018 B2 * | 10/2020 | Hahn | H01F 41/048 |
| 10,861,626 B2 | 12/2020 | Kim et al. | |
| 11,094,439 B2 | 8/2021 | Labombard et al. | |
| 11,417,464 B2 | 8/2022 | Labombard et al. | |
| 11,659,776 B2 | 5/2023 | Ha et al. | |
| 2005/0127928 A1 | 6/2005 | Kirby | |
| 2006/0071747 A1 | 4/2006 | Friedman et al. | |
| 2006/0077025 A1 | 4/2006 | Funaki et al. | |
| 2009/0194316 A1 | 8/2009 | Thomas et al. | |
| 2011/0143247 A1 | 6/2011 | An et al. | |
| 2013/0255991 A1 | 10/2013 | Snitchler et al. | |
| 2014/0302997 A1 | 10/2014 | Takayasu | |
| 2014/0312999 A1 | 10/2014 | Oomen | |
| 2015/0123760 A1 | 5/2015 | Meinke et al. | |
| 2016/0155541 A1 | 6/2016 | Jenner et al. | |
| 2016/0156174 A1 | 6/2016 | Kirby et al. | |
| 2016/0232988 A1 | 8/2016 | Sykes et al. | |
| 2017/0179364 A1 | 6/2017 | Schwartz et al. | |
| 2017/0221609 A1 | 8/2017 | Kurihara | |
| 2017/0338009 A1 | 11/2017 | van der Laan | |
| 2018/0158586 A1 | 6/2018 | Meinke et al. | |
| 2018/0164388 A1 | 6/2018 | Guenter et al. | |
| 2018/0261753 A1 | 9/2018 | Wilson et al. | |
| 2019/0172612 A1 | 6/2019 | Ohsugi | |
| 2019/0385771 A1 | 12/2019 | Painter | |
| 2020/0111589 A1 | 4/2020 | Yamaguchi et al. | |
| 2020/0169158 A1 | 5/2020 | Buhrer et al. | |
| 2020/0194153 A1 | 6/2020 | Brunner | |
| 2020/0211744 A1 | 7/2020 | Labombard et al. | |
| 2020/0279681 A1 | 9/2020 | Radovinsky et al. | |
| 2020/0365304 A1 | 11/2020 | Slade et al. | |
| 2020/0381155 A1 | 12/2020 | Slade | |
| 2021/0350957 A1 | 11/2021 | Takayasu et al. | |
| 2022/0013256 A1 | 1/2022 | Hubbard et al. | |
| 2022/0336130 A1 | 10/2022 | Labombard et al. | |
| 2023/0073419 A1 | 3/2023 | Labombard et al. | |
| 2023/0101820 A1 | 3/2023 | Radovinsky et al. | |
| 2023/0146164 A1 | 5/2023 | Labombard et al. | |

FOREIGN PATENT DOCUMENTS

| | | | |
|---|---|---|---|
| CN | 102867601 | A | 1/2013 |
| CN | 103035354 | | 4/2013 |
| CN | 103794297 | | 5/2014 |
| CN | 103794297 | A * | 5/2014 |
| CN | 106 298 149 | A | 1/2017 |
| CN | 109 102 987 | A | 12/2018 |
| EP | 0 667 627 | B1 | 11/1998 |
| EP | 3 499 519 | | 6/2019 |
| EP | 3 499 519 15 | | 6/2019 |
| GB | 2578307 | A | 5/2020 |
| GB | 2600110 | | 4/2022 |
| JP | S 54-60476 | A | 5/1979 |
| JP | S54106864 | | 8/1979 |
| JP | 55125601 | A * | 9/1980 |
| JP | S55125601 | | 9/1980 |
| JP | S57 108314 | U | 7/1982 |
| JP | S57108314 | | 7/1982 |
| JP | S 58-40803 | A | 3/1983 |
| JP | 61-159711 | | 7/1986 |
| JP | S61159711 | | 7/1986 |
| JP | S63293801 | | 11/1988 |
| JP | S 64-39008 | A | 2/1989 |
| JP | H 06-243745 | A | 9/1994 |
| JP | 08-055526 | | 2/1996 |
| JP | H 02873924 | | 10/1996 |
| JP | 09027416 | | 1/1997 |
| JP | H 11-3814 | A | 1/1999 |
| JP | H 11-43308 | A | 2/1999 |
| JP | H11135320 | | 5/1999 |
| JP | 2000277322 | A | 10/2000 |
| JP | 2003 007526 | A | 1/2003 |
| JP | 2003112097 | | 4/2003 |
| JP | 2004527431 | | 9/2004 |
| JP | 2006196720 | A * | 7/2006 |
| JP | 2008041966 | A | 2/2008 |
| JP | 2008244280 | A | 10/2008 |
| JP | 2009-170550 | | 7/2009 |
| JP | 2009188366 | | 8/2009 |
| JP | 2010181797 | | 8/2010 |
| JP | 2011-228065 | A | 11/2011 |
| JP | 2012-195413 | A | 10/2012 |
| JP | 2013080849 | | 5/2013 |
| JP | 2015-012182 | A | 1/2015 |
| JP | 2017-63083 | A | 3/2017 |
| JP | 6180729 | B2 | 8/2017 |
| JP | 2017 175031 | A | 9/2017 |
| JP | 2017175031 | | 9/2017 |
| JP | 2019 102298 | A | 6/2019 |
| JP | 2019102298 | | 6/2019 |
| KR | 10-0717351 | B1 | 5/2007 |
| KR | 10-1637468 | | 7/2016 |

(56) References Cited

FOREIGN PATENT DOCUMENTS

| WO | WO 01/06524 48 | 1/2001 |
|---|---|---|
| WO | WO 2008/011184 | 1/2008 |
| WO | WO 2010/042259 | 4/2010 |
| WO | WO 2011/074092 A1 | 6/2011 |
| WO | WO 2014/201242 A1 | 12/2014 |
| WO | WO 2017/042543 A1 | 3/2017 |
| WO | WO 2020/139832 | 7/2020 |
| WO | WO 2021/055037 A2 | 3/2021 |
| WO | WO 2021/055037 A3 | 3/2021 |
| WO | WO 2021/178697 | 9/2021 |
| WO | WO 2021/195330 | 9/2021 |
| WO | WO 2021/195330 53 | 9/2021 |
| WO | WO 2021/195383 | 9/2021 |
| WO | WO 2021/195383 47 | 9/2021 |
| WO | WO 2021/236185 | 11/2021 |
| WO | WO 2021/252330 A1 | 12/2021 |
| WO | WO 2021/262319 | 12/2021 |
| WO | PCT/US2022/030047 | 5/2022 |
| WO | PCT/US2022/049876 | 11/2022 |

OTHER PUBLICATIONS

U.S. Appl. No. 17/919,942, filed Oct. 19, 2022, Labombard, et al.
U.S. Appl. No. 18/008,279, filed Dec. 5, 2022, Radovinsky, et al.
Green, et al.; "The ITER Project: Status and Prospects"; IEEE Transactions on Magnetics; vol. 32; No. 4; Jul. 1996; 6 Pages.
Chen, et al.; "Development of a Digital Quench Detection and Dumping Circuit With Constant Voltage System for Smes"; IEEE Transactions on Applied Superconductivity; vol. 20, No. 3; Jun. 2010; 4 Pages.
Alfaro, et al.; "Vacuum Assisted Liquified Metal (VALM) TSV Filling Method with Superconductive Material"; MEMS 2018; Jan. 21-25, 2018; 4 Pages.
Barth, et al.; "Electro-mechanical properties of REBCO coated conductors from various industrial manufacturers at 77K, self-field and 4.2K, 19T"; Superconductor Science and Technology; Feb. 13, 2015; 11 Pages.
Bauer, et al.; "Review of material properties, past experiences, procedures, issues and results for a possible solder filled cable as Plan B conductor for the EFDA dipole magnet (Draft Vs 1)"; EFDA CSU report LRP 830/07; May 2007; 29 Pages.
Bauer, et al.; "Solder-Filling of A CICC Cable for the EFDA Dipole Magnet"; AIP Conference Proceedings 986, 151; Jan. 2008; 9 Pages.
Bauer; "Development of HTS Current Leads for the ITER Project"; ITER Technical Report, Report No. ITR-18-001; Feb. 28, 2018; 47 Pages.
Bradford et al., "Controllable Critical Current Degradation of ReBCO CC by Post-Manufacturing Deoxygenation", Applied Superconductivity Center, Florida State University, Published Sep. 2019; 21 Pages.
Bruzzone; "Selected Results of Conductor R&D from the SULTAN Test Facility"; Progress in Electromagnetic Research Symposium 2004; Pisa, Italy; Mar. 28-31, 2004; 4 Pages.
Celentano, et al.; "Design of an Industrially Feasible Twisted-Stack HTS Cable-in-Conduit Conductor for Fusion Application"; IEEE Transactions on Applied Superconductivity; vol. 23; No. 3; Jul. 2014; 5 Pages.
Collings, et al.; "Bi:2212/Ag-based Rutherford cables: production, processing and properties"; Superconductor Science and Technology; vol. 12; No. 2; Feb. 1, 1999; 3 Pages.
Dietderich, et al.; "Critical Current Variation as a Function of Transverse Stress of Bi-2212 Rutherford Cables"; IEEE Transactions on Applied Superconductivity; vol. 11; No. 1; Mar. 2001; 3 Pages.
Japanese Request of Examination and Voluntary Amendment with amended claims (with English translation) dated Dec. 15, 2022 for Japanese Application No. 2021-534337; 10 Pages.
Fietz, et al.; "High Current HTS Cables—Status and Actual Development"; IEEE/CSC & ESAS Superconductivity News Forum (global edition); Oct. 18-23, 2015; 43 Pages.
Goldacker, et al.; "Roebel cables from REBCO coated conductors: a one-century-old concept for the superconductivity of the future"; Superconductor Science and Technology; Aug. 13, 2014; 17 Pages.
Goldacker, et al.; Improvement of Superconducting properties in ROEBEL Assembled Coated Conductors (RACC); IEEE Transactions on Applied Superconductivity; vol. 19; No. 3; Jun. 2009; 4 Pages.
Indium Corporation; Data sheet 5RMA-RC and 5RA-RC; Jan. 2019; 8 Pages.
Kario, et al. "Investigation of a Rutherford Cable Using Coasted Conductor Roebel Cables as Strands"; Superconductor Science Technology 26 (2013) 085019 (6pp); http://iopscience.iop.org/0953-2048-26/8/085019; Published on Jul. 4, 2013; 7 Pages.
Li, et al.; "Feasibility Study of the Impregnation of a No-Insulation HTS Coil Using Solder"; IEEE Transactions on Applied Superconductivity; vol. 28, No. 1; Jan. 2018; 5 Pages.
Li, et al.; "Development of a Novel Soldered-Stacked-Square (3S) HTS Wire Using 2G Narrow Tapes With 1 mm Width"; IEEE Transactions on Applied Superconductivity; vol. 27, No. 4; Jun. 2017; 4 Pages.
Liao, et al.; "Signal De-Noising of Quench Detection by Real-Time Wavelet Analysis Algorithm for HTS Coil and Magnet"; IEEE Transactions on Applied Superconductivity; vol. 27, No. 4; Jun. 2017; 5 Pages.
Mei, et al.; "Effects of Cooling Rate on Mechanical Properties of Near-Eutectic Tin-Lead Solder Joints"; Journal of Electronic Materials; vol. 20, No. 8; Feb. 15, 1991; 10 Pages.
Mogro-Campero, et al.; "Degradation of Thin Films of YBa2Cu307 by Annealing in Air and in Vacuum"; Journal of Superconductivity; vol. 8; No. 1; Jan. 1995; 4 Pages.
Markiewicz, et al.; "900 MHz Wide Bore NMR Spectrometer Magnet at NHMFL"; IEEE Transactions on Applied Superconductivity; vol. 10, No. 1; Mar. 2000; 4 Pages.
Nishijima et al., "Mechanical and Transport Characteristic Exploration for Coated Conductors by Hoop Stress Tests;" Physica C.; May 18, 2011; vol. 471, No. 21; 5 Pages.
Office Action dated Aug. 17, 2022 for U.S. Appl. No. 17/291,120; 7 Pages.
Patil, et al.; "Causes of Casting Defects with Remedies"; International Journal of Engineering Research & Technology (IJERT); vol. 4, Issue 11; Nov. 2015; 6 Pages.
PCT International Search Report and Written Opinion of the ISA dated Jun. 25, 2021 for International Application No. PCT/US2021/020916; 15 Pages.
PCT International Search Report and Written Opinion dated Jan. 7, 2022 for International Application No. PCT/US2021/031699; 16 Pages.
PCT International Preliminary Report on Patentability dated May 27, 2022 for International Application No. PCT/US2020/060170; 12 Pages.
PCT International Preliminary Report on Patentability dated Sep. 15, 2022 for International Application No. PCT/US2021/020916; 8 Pages.
PCT International Search Report and Written Opinion dated Jun. 25, 2021 for International Application No. PCT/US2021/024160; 14 Pages.
PCT International Preliminary Report on Patentability dated Oct. 6, 2022 for International Application No. PCT/US2021/024160; 8 Pages.
PCT International Search Report and Written Opinion dated Jun. 9, 2021 for International Application No. PCT/US2021/018962; 17 Pages.
PCT International Search Report and Written Opinion dated Feb. 1, 2022 for International Application No. PCT/US2021/30207; 13 Pages.
PCT International Preliminary Report on Patentability dated Nov. 17, 2022 for International Application No. PCT/US2021/030207; 10 Pages.
PCT International Preliminary Report dated Mar. 25, 2021 for International Application No. PCT/US2021/024079; 11 Pages.

(56) References Cited

OTHER PUBLICATIONS

International Preliminary Report on Patentability dated Jan. 5, 2023 for International Application No. PCT/US2021/031699; 10 Pages.

PCT International Preliminary Report on Patentability dated Dec. 1, 2022 for International Application No. PCT/US2021/018962; 11 Pages.

International Search Report and Written Opinion of the ISA dated Jan. 26, 2022 for International Application No. PCT/US2021/020225; 15 Pages.

International Patent Cooperation Treaty PCT Third Party Observation dated Jul. 7, 2022 for International Application No. PCT/US2021/020225; 4 Pages.

International Communication in Cases For Which No Other Form is Applicable dated Jul. 7, 2022 for International Application No. PCT/US2021/020225; NPL References; 15 Pages.

Pierro, et al.; "Finite element investigation of the mechanical behaviour of a Twisted Stacked-Tape Cable exposed to large Lorentz loads"; IOP Conf. Series: Material Science and Engineering 279; Jan. 2017; 9 Pages.

Prasad, et al.; "Fabrication of New Joints for SST-1 TF Coil Winding Packs"; Fusion Engineering and Design; www.elsevier.com/locate/fusengdes; Jun. 2013; 5 Pages.

Preuss, et al.; "Critical Current Degradation of Coated Conductors Under Soldering Conditions"; IEEE Transactions on Applied Superconductivity; vol. 28; No. 4; Jun. 2018; 5 Pages.

Restriction Requirement dated Jun. 15, 2022 for U.S. Appl. No. 17/291,120; 7 Pages.

Response to Restriction Requirement dated Jun. 15, 2022 for U.S. Appl. No. 17/291,120, filed Aug. 1, 2022; 1 Page.

Response to Office Action dated Aug. 17, 2022 for U.S. Appl. No. 17/291,120, filed Nov. 17, 2022; 16 Pages.

Search Report and Written Opinion of the ISA for International Application No. PCT/US2020/060170 dated Feb. 16, 2021; 20 Pages.

Sumption, et al.; "Measurements of RRR Variation in Strands Extracted From Nb3Sn-Type Rutherford Cables"; AIP Conference Proceedings 986,277; Mar. 4, 2008; 10 Pages.

Ta, et al.; "Comparison study of cable geometries and superconducting tape layouts for high-temperature superconductor cables"; Cryogenics; Mar. 1, 2018; 7 Pages.

Takayasu, et al.; "Conductor Characterization of YBCO Twisted Stacked-Tape Cables"; IEEE Transactions on Application Superconductivity; vol. 23, No. 3; Jun. 2013; 4 Pages.

Takayasu, et al.; "Present Status and Recent Developments of the Twisted Stacked-Tape Cable Conductor"; IEEE Transactions on Applied Superconductivity; vol. 26; No. 2; Mar. 2016; 10 Pages.

Tsui, et al.; "Soldered Joints—An Essential Component of Demountable High Temperature Superconducting Fusion Magnets"; IOP Publishing, Superconductor Science and Technology; vol. 29, Jan. 2016; 16 Pages.

Uglietti; "A review of commercial high temperature superconducting material for large magnets: from wires and tapes to cables and conductors"; Superconductor Science and Technology; Jan. 2019; 30 Pages.

Uglietti, et al.; "Critical currents versus applied strain for industrial Y-123 coated conductors at various temperatures and magnetic fields up to 19 T", Supercond. Sci. Technol. 19; pp. 869-872; Jul. 5, 2006; 5 Pages.

Van der Laan, et al.; Characterization of a high-temperature superconducting conductor on round core cables in magnetic fields up tp 20 T; Superconductor Science and Technology 26; Feb. 13, 2013; 10 Pages.

Whyte, et al.; "Smaller & Sooner: Exploiting High Magnetic Fields from New Superconductors for a More Attractive Fusion Energy Development Path"; J Fusion Energ (2016) 35:41-53; Jan. 22, 2016; 13 Pages.

Xi, et al.; "Influence of External Magnetic Field on the Critical Current of a Novel HTS Square Wire"; Proceedings of 2018 IEEE International Conference on Applied Superconductivity and Electromagnetic Devices; Apr. 2018; 2 Pages.

Yanagi, et al.; "Feasibility of HTS Magnet Option for Fusion Reactors"; Plasma and Fusion Research: Regular Articles; vol. 9, No. 1405013; Jan. 1, 2014; 6 Pages.

Yanagi, et al.; "Progress of the Design of HTS Magnet Option and R&D Activities for the Helical Fusion Reactor"; IEEE Transactions on Applied Superconductivity, vol. 24, No. 3; Jun. 2014; 5 Pages.

Anwar, et al.; "Direct Penetration of Spin-Triplet Superconductivity into a Ferromagnet in Au/SrRuO3/Sr2RuO4 Junctions"; Nature Communications; 7:13220; Oct. 26, 2016; pp. 1-7; 7 Pages.

Choi, et al.; "A novel no-insulation winding technique of high temperature-superconducting racetrack coil for rotating applications: A progress report in Korea university"; Review of Scientific Instruments 87; 104704; American Institute of Physics; Oct. 7, 2016; 12 Pages.

Hahn, et al.; "No-insulation multi-width winding technique for high temperature superconducting magnet"; Applied Physics Letters 103, 173511; American Institute of Physics; Oct. 23, 2013; 3 Pages.

Kim, et al.; "Investigation on quench initiation and propagation characteristics of GdBCO coil co-wound with a stainless steel tape as turn-to-turn metallic insulation"; Review of Scientific Instruments 87; 114701; American Institute of Physics; Nov. 2, 2016; 6 Pages.

Minervini, et al.; "Superconducting Magnets Research for a Viable US Fusion Program"; https://fire.pppl.gov/SC_Magnet_Research_White_Paper.pdf; Publication date unknown; Downloaded on Dec. 1, 2018; pp. 1-11; 11 Pages.

PCT International Preliminary Report on Patentability dated Jul. 8, 2021 for International Patent Application No. PCT/US2019/068332; 16 Pages.

PCT International Preliminary Report on Patentability dated Dec. 1, 2022 for International Application No. PCT/2021/033349; 17 Pages.

Response to Rule 161/162 Communication dated Aug. 3, 2021 for European Application No. 19843007.6; Response filed on Jan. 27, 2021; 7 Pages.

Notice of Allowance dated Jun. 30, 2017 for U.S. Appl. No. 15/090,847; 13 Pages.

Notice of Allowance dated Jul. 1, 2020 for U.S. Appl. No. 15/710,895; 9 Pages.

PCT International Search Report and Written Opinion dated Mar. 31, 2020 for International Application No. PCT/US2019/068332; 20 Pages.

Response to U.S. Non-Final Office Action dated Jan. 26, 2017 for U.S. Appl. No. 15/090,847, filed May 25, 2017; 6 Pages.

Response to Non-Final Office Action dated Mar. 17, 2020 for U.S. Appl. No. 15/710,895, filed Jun. 17, 2020; 8 Pages.

Response to Final Office Action dated Oct. 25, 2019 for U.S. Appl. No. 15/710,895, filed Jan. 27, 2020; 6 Pages.

U.S. Non-Final Office Action dated Oct. 20, 2020 for U.S. Appl. No. 10/233,410; 20 Pages.

U.S. Non-Final Office Action dated Oct. 20, 2020 for U.S. Appl. No. 16/416,781; 17 Pages.

U.S. Final Office Action dated Feb. 4, 2021 for U.S. Appl. No. 16/959,600; 15 Pages.

U.S. Non-Final Office Action dated Jan. 26, 2017 for U.S. Appl. No. 15/090,847; 7 Pages.

U.S. Final Office Action dated Oct. 25, 2019 for U.S. Appl. No. 15/710,895; 8 Pages.

U.S. Non-Final Office Action dated Mar. 17, 2020 for U.S. Appl. No. 15/710,895; 9 Pages.

Yazaki et al. "Critical Current Degradation in High-Temperature Superconducting Tapes Caused by Temperature Rise", IEEE Transaction on Applied Superconductivity, vol. 23, No. 3, Published June 2013; 4 Pages.

Response to Non-Final Office Action dated Oct. 20, 2020 for U.S. Appl. No. 16/959,600, filed Jan. 20, 2021; 13 Pages.

Response to Final Office Action dated Feb. 4, 2021 for U.S. Appl. No. 16/959,600, filed May 3, 2021; 10 Pages.

Semba, et al.; "Design and Manufacture of Superconducting Magnet for the Wiggler in Saga-LS"; Proceedings of IPAC'10, Kyoto, Japan; MOPEBO38; May 23, 2010; pp. 358-360; 3 Pages.

U.S. Non-Final Office Action dated Dec. 14, 2021 for U.S. Appl. No. 17/345,194; 11 Pages.

(56) References Cited

OTHER PUBLICATIONS

Response to U.S. Non-Final Office Action dated Dec. 14, 2021 for U.S. Appl. No. 17/345,194, filed Mar. 7, 2022; 12 Pages.
Notice of Allowance dated Apr. 12, 2022 for U.S. Appl. No. 17/345,194; 7 Pages.
Response filed on May 2, 2023 for European Application No. 21719448.9; 28 Pages.
Korean Office Action dated Nov. 2, 2022 for Korean Application No. 10-2021-7021732; 16 Pages.
Korean Amendment with Pending Claims (with English Translation) dated Dec. 29, 2022 for Korean Application No. 10-2021-7021732; 65 Pages.
Korean Final Notice of Preliminary Rejection dated Jan. 10, 2023 for Korean Application No. 10-2021- 7021732; 6 Pages.
Korean Notice of Allowance with Allowed Claims in English dated Mar. 21, 2023 for Korean Application No. 10-2021-7021732; 15 Pages.
Examination Report dated May 10, 2023 for European Application No. 19843007.6; 8 Pages.
Response filed on May 8, 2023 for European Application No. 21719774.8; 13 Pages.
Search Report dated Jul. 15, 2021 for International Application No. PCT/US2021/024079; 33 Pages.
Response filed on Jul. 2, 2023 for European Application No. 21732726.1; 11 Pages.
Notice of Allowance dated Jun. 30, 2023 for U.S. Appl. No. 17/810,038; 22 Pages.
Japanese Response (with Machine Translation from Espacenet.com) to Office Action dated Oct. 18, 2023 for Japanese Application No. 2021-534337; Response filed Jan. 17, 2024; 16 Pages.
Japanese Notice of Allowance (with English Translation) dated Apr. 1, 2024 for Japanese Application No. 2021-534337; 9 Pages.
Response to European Communication dated Nov. 27, 2023 for European Application No. 21719448.9; Response filed Mar. 25, 2024; 31 Pages.
PCT International Search Report and Written Opinion dated Apr. 8, 2024 for International Application No. PCT/US2023/083812; 12 Pages.
Examination Report Dated Nov. 27, 2023 for Application No. 21719448.9; 4 Pages.
Response to Examination Report dated Feb. 2, 2023 for European Application No. 21811542.6 as filed on Aug. 9, 2023; 15 Pages.
Response to Examination Report dated May 10, 2023 for European Application No. 19843007.6 as filed on Sep. 6, 2023; 24 Pages.
U.S. Notice of Allowance dated Aug. 28, 2024 for U.S. Appl. No. 18/476,886; 8 Pages.
Response (with English Translation) to Korean Office Action dated Mar. 22, 2024 for Korean Application No. 10-2023-7020578; Response Filed Jul. 19, 2024; 16 Pages.
Response to Korean Office Action (with English Translation) dated Jan. 8, 2025 for Korean Application No. 10-2022-7045023, Response Filed Apr. 1, 2025, 60 Pages.
Response to Japanese Office Action (with English Translation of Claims) dated Jan. 17, 2025 for Japanese Application No. 2022-579656, Response Filed Apr. 17, 2025, 12 Pages.
Korean Office Action (with English Translation) dated Mar. 4, 2025 for Korean Application No. 10-2022-7043520; 18 Pages.
Response to Korean Office Action (with English Translation) dated Jan. 2, 2025 for Korean Application No. 10-2022-7036137, Response Filed Apr. 2, 2025, 34 Pages.
Response to Japanese Office Action (with English Translation) dated Jan. 30, 2025 for Japanese Application No. 2022-557716, Response Filed May 27, 2025, 10 Pages.
European Intention to Grant dated Mar. 27, 2025 for European Application No. 21719448.9; 9 Pages.
Response to Korean Office Action (with English Translation) dated Jan. 2, 2025 for Korean Application No. 10-2022-7037032; Response Filed Apr. 2, 2025, 57 Pages.
Japanese Office Action (with English Translation) dated Apr. 23, 2025 for Japanese Application No. 2022-557713; 6 Pages.
Korean Notice of Allowance (with English Translation) dated May 29, 2025 for Korean Application No. 10-2022-7037032; 6 Pages.
Restriction Requirement dated May 22, 2025 for U.S. Appl. No. 17/919,942; 6 Pages.
Response to European Official Communication dated Aug. 12, 2024 for European Application No. 21732726.1; Response Filed Dec. 2, 2024; 19 Pages.
Extended European Search Report dated Dec. 4, 2024 for European Application No. 24200938.9; 10 Pages.
Japanese Office Action (with Machine English Translation) dated Nov. 28, 2024 for Japanese Application No. 2024-64599; 6 Pages.
Gade, "Conceptual Design of High Temperature Superconducting Toroidal Field Coils for Future Fusion Power Plants;" Dissertation from Karlsruher Institute fur Technologie (KIT); Jan. 1, 2019; 152 Pages.
Mangiarotti, "Design of Demountable Toroidal Field Coils with REBCO Superconductors for a Fusion Reactor;" Partial Fulfillment of the Requirements for the Degree of Doctor of Philosophy in Nuclear Science and Engineering at MIT; Feb. 2016; 145 Pages.
Response to European Communication Under Rule 71(3) dated May 24, 2024 for European Application No. 19843007.6; Response Filed Sep. 24, 2024; 13 Pages.
European Examination Report dated Oct. 18, 2024 for European Application No. 21811542.6; 9 Pages.
European Examination Report dated Aug. 12, 2024 for European Application No. 21732726.1; 5 Pages.
Japanese Examination Report (with Machine English Translation from Espacenet.com) dated Oct. 21, 2024 for Japanese Application No. 2022-570130; 12 Pages.
Response to European Examination Report dated May 14, 2024 for European Application No. 21719774.8; Response Filed Sep. 12, 2024; 12 Pages.
European Intention to Grant dated Oct. 9, 2024 for European Application No. 21719448.9; 12 Pages.
PCT International Search Report and Written Opinion dated Feb. 29, 2024 for International Application No. PCT/US2023/081302; 19 Pages.
Canadian Office Action dated Jan. 9, 2025 for Canadian Patent Application No. 3, 122,318; 4 pages.
Response to Japanese Office Action (with English translation) dated Dec. 3, 2024 for Japanese Patent Application No. 2024-064599; Response filed on Jan. 15, 2025; 15 pages.
Japanese Decision to Grant Patent (with English translation) dated Jan. 21, 2025 for Japanese Patent Application No. 2024-064599; 9 pages.
Korean Notice of Allowance (with English translation) dated Jan. 24, 2025 for Korean Patent Application No. 10-2023-7020578; 9 pages.
Japanese Office Action (with English translation) dated Jan. 22, 2025 for Japanese Patent Application No. 2022-579656; 11 pages.
Korean Office Action (with English translation) dated Jan. 8, 2025 for Korean Patent Application No. 10-2022-7045023; 14 pages.
Response to Japanese Office Action (with English translation) dated Oct. 23, 2024 for Japanese Patent Application No. 2022-570130; Response filed Jan. 22, 2025; 21 pages.
Japanese Decision to Grant Patent (with English translation) dated Jan. 24, 2025 for Japanese Patent Application No. 2022-570130; 13 pages.
Japanese Office Action (with English machine translation) dated Jan. 30, 2025 for Japanese Patent Application No. 2022-557716; 10 pages.
Korean Office Action (with English translation) dated Jan. 2, 2025 for Korean Patent Application No 10-2022-7036137; 14 pages.
Response to European Communication under Rule 71(3) dated Oct. 9, 2024 for European Patent Application No. 21719448.9; Response filed Feb. 7, 2025; 8 pages.
Korean Office Action (with English translation) dated Jan. 2, 2025 for Korean Patent Application No. 10-2022-7037032; 14 pages.
Xi et al., "Influence of External Magnetic Field on the Critical Current of a Novel HTS Square Wire"; 2018 IEEE International Conference on Applied Superconductivity and Electromagnetic Devices; Apr. 15-18, 2018; 2 pages.

(56) References Cited

OTHER PUBLICATIONS

Yanagi et al., "Feasibility of HTS Magnet Option for Fusion Reactors"; The Japan Society of Plasma Science and Nuclear Fusion Research; vol. 9; Aug. 2014; 6 pages.
PCT International Search Report and Written Opinion dated Dec. 10, 2021 for International Application No. PCT/US2021/033349; 25 Pages.
European Examination Report dated May 14, 2024 for European Application No. 21719774.8, 9 pages.
Notice of Allowance dated May 23, 2024 for U.S. Appl. No. 18/476,886, 9 pages.
Intention of grant dated May 24, 2024 for European Application No. 19843007.6, 10 pages.
PCT International Search Report and Written Opinion dated Jun. 5, 2024 for International Patent Application No. PCT/US2024/013492; 14 pages.
Korean Notice of Allowance (with English Translation) dated May 20, 2025 for Korean Application No. 10- 2022-7036137, 5 Pages.
Canadian Exam Report dated May 26, 2025 for Canadian Application No. 3,173,407, 3 Pages.
PCT International Preliminary Report on Patentability dated Jun. 12, 2025 for International Application No. PCT/US2023/081450; 16 Pages.
PCT International Preliminary Report on Patentability dated Jun. 26, 2025 for International Application No. PCT/US2023/083812; 8 Pages.
PCT International Preliminary Report on Patentability dated Jun. 12, 2025 for International Application No. PCT/US2023/081302; 13 Pages.
U.S. $3^{rd}$ Notice of Allowance dated Jan. 2, 2025 for U.S. Appl. No. 18/476,886; 8 Pages.
European Intention to Grant (with Allowed Claims) dated Oct. 25, 2024 for European Application No. 19843007.6; 13 Pages.
PCT International Search Report and Written Opinion dated Mar. 11, 2024 for International Patent Application No. PCT/US2023/081450; 23 pages.
Office Action dated Mar. 22, 2024 for Korean Application No. 10-2023-7020578 with English Translation; 9 Pages.
Japanese Notice of Allowance (with English Translation) dated Jul. 2, 2025 for Japanese Application No. 2022-579656; 8 Pages.
Response to Japanese Office Action (with English Translation) dated Apr. 18, 2025 for Japanese Application No. 2022-557713, Response Filed Jul. 23, 2025, 17 Pages.
Alam "Development of high strength Sn—CU solder using copper particles at nanolength scale"; Journal of alloys and Compounds 476 (2009); Oct. 31, 2008; 8 pages.
Non Final Office Action dated Aug. 12, 2022 for U.S. Appl. No. 17/913,609; 52 Pages.
Non Final Office Action dated Aug. 12, 2022 for U.S. Appl. No. 17/796,762; 42 Pages.
Non Final Office Action dated Aug. 7, 2025 for U.S. Appl. No. 17/919,942; 34 Pages.
Response to Restriction Requirement dated May 22, 2025 for U.S. Appl. No. 17/919,942 Response filed Jul. 28, 2025; 9 Pages.

* cited by examiner

TECHNIQUES FOR DISTRIBUTING FORCES IN HIGH FIELD MAGNETS AND RELATED SYSTEMS AND METHODS

CROSS REFERENCE TO RELATED APPLICATIONS

This application is a 371 National Stage Entry of International Patent Application PCT/US2021/033349 filed in the English language on May 20, 2021, which claims the benefit of U.S. Provisional application 63/027,552, filed on May 20, 2020, which applications are hereby incorporated herein by reference in their entireties.

FIELD

The disclosure pertains generally to superconducting magnet coils, and more particularly to construction and cooling of high temperature superconductor (HTS) magnet assemblies.

BACKGROUND

Superconductors are materials that have no electrical resistance to current (are "superconducting") below some critical temperature. For many superconductors, the critical temperature is below 30 K, such that operation of these materials in a superconducting state requires significant cooling, such as with liquid or cold gas helium or other cryogens.

High-field magnets are often constructed from superconductors due to the capability of superconductors to carry a high current without resistance. Such magnets may, for instance, carry currents greater than 5 kA.

SUMMARY

According to some aspects, a high temperature superconductor (HTS) magnet is provided comprising a coil comprising HTS material, a housing comprising at least a first partition, wherein the coil is arranged within the housing, the first partition of the housing is arranged to separate a first portion of the coil from a second portion of the coil such that turns of the first portion of the coil are entirely arranged within the first partition and turns of the second portion of the coil are entirely arranged outside of the first partition, and the first partition comprises a slit through which the coil passes.

According to some aspects, a magnet assembly is provided comprising a plurality of pancakes, each of the pancakes having one or more turns of a high temperature superconductor (HTS) tape that produce a magnetic field when an electrical current is applied, each of the pancakes also having one or more joints for electrically coupling the one or more turns of its HTS tape as part of an electrical circuit, and a plurality of cooling plates, each of the cooling plates having a terminal for thermally coupling the cooling plate to a cooling apparatus, wherein the plurality of pancakes and the plurality of cooling plates are stacked in an alternating fashion, each of the pancakes being electrically coupled by its one or more joints to the joints of either one or two neighboring pancakes, thereby forming an operating current path that includes the HTS tape in each of the pancakes, and each of the pancakes being adjacent to either one or two of the cooling plates for removing heat from the pancake via thermal conduction to the cooling apparatus.

According to some aspects, a magnet assembly is provided comprising a plurality of pancakes, each of the pancakes comprising a housing, a plurality of turns of a high temperature superconductor (HTS) tape arranged within the housing, and one or more conductive joints coupled to the HTS tape and arranged on an exterior of the housing, and a plurality of cooling plates, each of the cooling plates having a terminal for thermally coupling the cooling plate to a cooling apparatus, wherein the plurality of pancakes and the plurality of cooling plates are arranged in a stack in an alternating fashion, each of the pancakes in the stack being electrically coupled by its one or more conductive joints to the joints of either one or two neighboring pancakes in the stack, thereby forming an operating current path through the stack that includes the HTS tape in each of the pancakes, and each of the pancakes being adjacent to and thermally coupled to either one or two of the cooling plates.

According to some aspects, a housing is provided for retaining wound tape to generate a magnetic field, the housing comprising a first structural plate having one or more first circular slots, one or more partitions, each partition having a feedthrough for winding the tape from an inside diameter of the partition to an outside diameter of the partition, each partition being removably and rotatably inserted into a corresponding one of the first circular slots, and a second structural plate having one or more second slots, each partition being removably inserted into a corresponding one of the second slots.

According to some aspects, a method of winding a conductive tape to form a magnet is provided, the method comprising (a) providing a first structural plate having a surface with one or more circular slots and having, at an inside diameter thereof, a first electrical joint, (b) physically and electrically coupling the conductive tape to the first electrical joint, (c) on the surface of the first structural plate, circularly winding the conductive tape until the conductive tape reaches one of the circular slots, (d) removably inserting, into the one of the circular slots, a partition having a feedthrough, wherein the partition is rotated within the one of the circular slots so that its feedthrough aligns with an azimuthal location of the wound conductive tape, and (e) on the surface of the first structural plate, winding the conductive tape through the feedthrough and around an outside diameter of the partition to thereby minimize a gap between the conductive tape and the partition.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
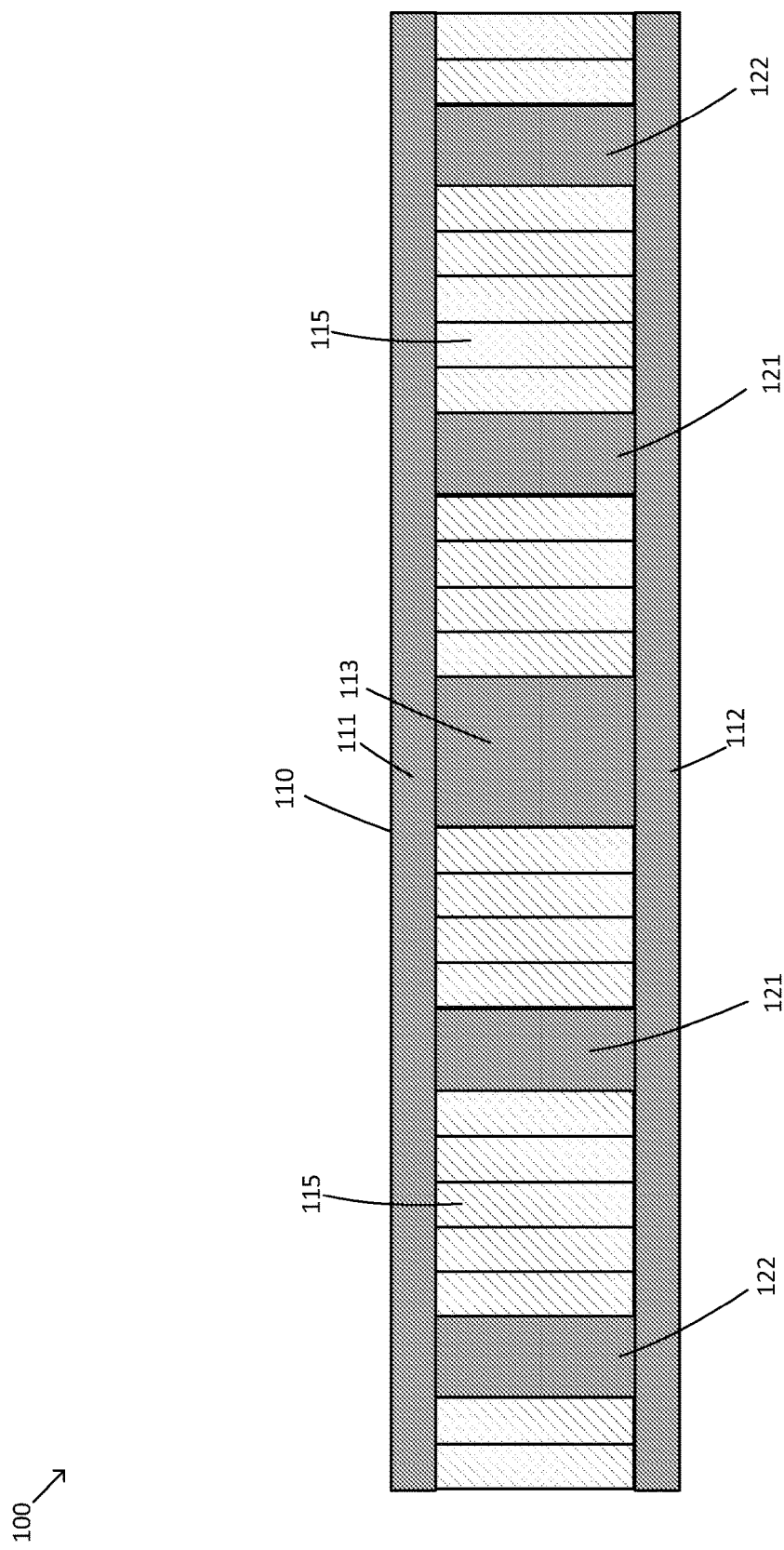
FIG. 1 depicts a cross-sectional view of a superconducting magnet comprising structural partitions, according to some embodiments.

As noted above, high-field magnets are often constructed from superconducting material due to the capability of superconductors to carry a high current without resistance. When a superconducting material is cold enough to be below its critical temperature (the temperature below which the electrical resistivity of the material drops to zero), the magnet allows current to pass through the superconducting path without losses.

High temperature superconductors (HTS) provide particularly desirable opportunities for building high-field superconducting magnets. Important features of HTS and HTS rare-earth barium copper oxide (REBCO) superconductors, as compared to low temperature superconductors (LTS), include the following. First, HTS exhibit a smaller critical current sensitivity to the operating temperature, permitting larger operating temperature margins. Second, HTS has operating temperatures higher than those of LTS, and at HTS operating temperatures the heat capacity of materials within a superconducting magnet may be significantly higher than at LTS operating temperatures. As a result, HTS magnets may have a smaller sensitivity to local heating. Third, HTS have compatibility with electrically non-insulated design principles due to good current sharing between bundled sections of HTS as described further below. Fourth, in a non-insulated superconducting magnet, small voltages (e.g., less than about 1 V) may develop in the magnet, but in an HTS superconducting magnet these voltages may not require high-voltage electrical insulation, unlike LTS magnets. And finally, HTS magnets can operate at much higher magnetic fields and may demonstrate a lower sensitivity to the strength of the field than do LTS magnets.

Irrespective of whether a superconducting magnet comprises LTS or HTS material, in general a superconducting magnet is capable of carrying a relatively high current density (e.g., a high amount of current per unit volume or per unit cross-sectional area of superconducting material) while also producing a high magnetic field. High current density and high field results, however, in a significant Lorentz load (Lorentz forces resulting from current flowing in a magnetic field) applied to various regions of the superconductor. Such an increased Lorentz load may lead to reduced structural integrity of the magnet. For instance, in a high field magnet, strain applied to the superconducting material by Lorentz loads may be sufficient to cause damage to the material and lower or prevent its ability to carry current.

The inventors have recognized and appreciated techniques for lowering strains applied to superconducting material in a superconducting magnet by arranging structural partitions between turns of the superconducting material that intercept and transfer strain to a mechanically stronger structure, such as the housing of the magnet. A structural partition may be formed with a feedthrough slit so that the superconducting material can easily pass through the partition. A number of structural partitions may be interspersed between groups of turns of superconducting material in a magnet so that forces can be sufficiently distributed by the partitions throughout the magnet. At the same time, the number of structural partitions may be selected to minimize the amount of space within the magnet occupied by the partitions that could otherwise be occupied by current-carrying superconducting material.

According to some embodiments, structural partitions may be removable from the housing or other supporting structure of a magnet. Removable partitions may allow turns of the magnet to be wound in the absence of the partitions, then the partitions can be added to the magnet when the magnet has been wound sufficiently to pass through a feedthrough slit in the partition. This process may allow the magnet to be wound in a single plane, thereby simplifying the assembly process, since the windings can be made around a structure (a partition or a central structure of the housing) in the same plane, then a partition added as necessary when the winding grows in size.

According to some embodiments, structural partitions may be movable within the magnet housing or other supporting structure such that the position of the feedthrough slit can be adjusted during winding. In some cases, the structural partitions may be arranged within a groove, slot and/or other retaining feature(s) within the magnet so that it can be rotated or otherwise position adjusted while its position is limited to some extent by the retaining feature(s). For instance, the structural partitions may be circular and may be rotatable within a circular groove. In some cases, the structural partitions may be non-circular (e.g., rectangular) and may not be rotatable within the magnet. In such cases, however, small retaining features may be included in the magnet housing or other supporting structure to reduce motion of the partition during winding and installation of the partition. Alternatively, the structural partitions may freely move within the magnet structure, but may be held in place to some extent during winding by placing the partition around turns of the magnet that substantially fill the interior of the partition. In some cases, the structural partitions may comprise multiple jointed pieces that can independently move while being constrained by their coupling to other pieces. For instance, the structural partition may include a plurality of sections arranged in a loop with adjacent sections being rotatably coupled to one another (e.g., comparable to a bicycle chain).

According to some embodiments, a superconducting magnet may comprise HTS material that is wound and that passes through one or more structural partitions as described above. In some cases, the HTS material may include HTS tape, which is a long, flat element that comprises a layer of polycrystalline HTS in addition to other layers. As used herein, an HTS "tape" may refer to any structure that includes a layer of an HTS, such as a rare-earth cuprate HTS (e.g., REBCO), and which may also contain one or more other layers such as one or more buffer layers, stabilizing layers, substrates, overlay layers and/or cladding layers, such as tape 1200 shown in FIG. 12.

In some embodiments, a superconducting magnet comprising one or more structural partitions as described herein may comprise HTS material that is wound without insulating material between at least some adjacent turns of the HTS material. In such a magnet, referred to herein as a non-insulated (NI) magnet (or a no-insulation magnet), adjacent superconducting turns of the magnet are not insulated from one another but are instead separated by a conventional conductor (i.e., not a superconductor). When the magnet is operating below the superconductor's critical temperature, current flows through the superconductor and not across turns because the superconductor has zero resistance compared with the finite resistance of the conductor that lies between the turns.

Figure 12:
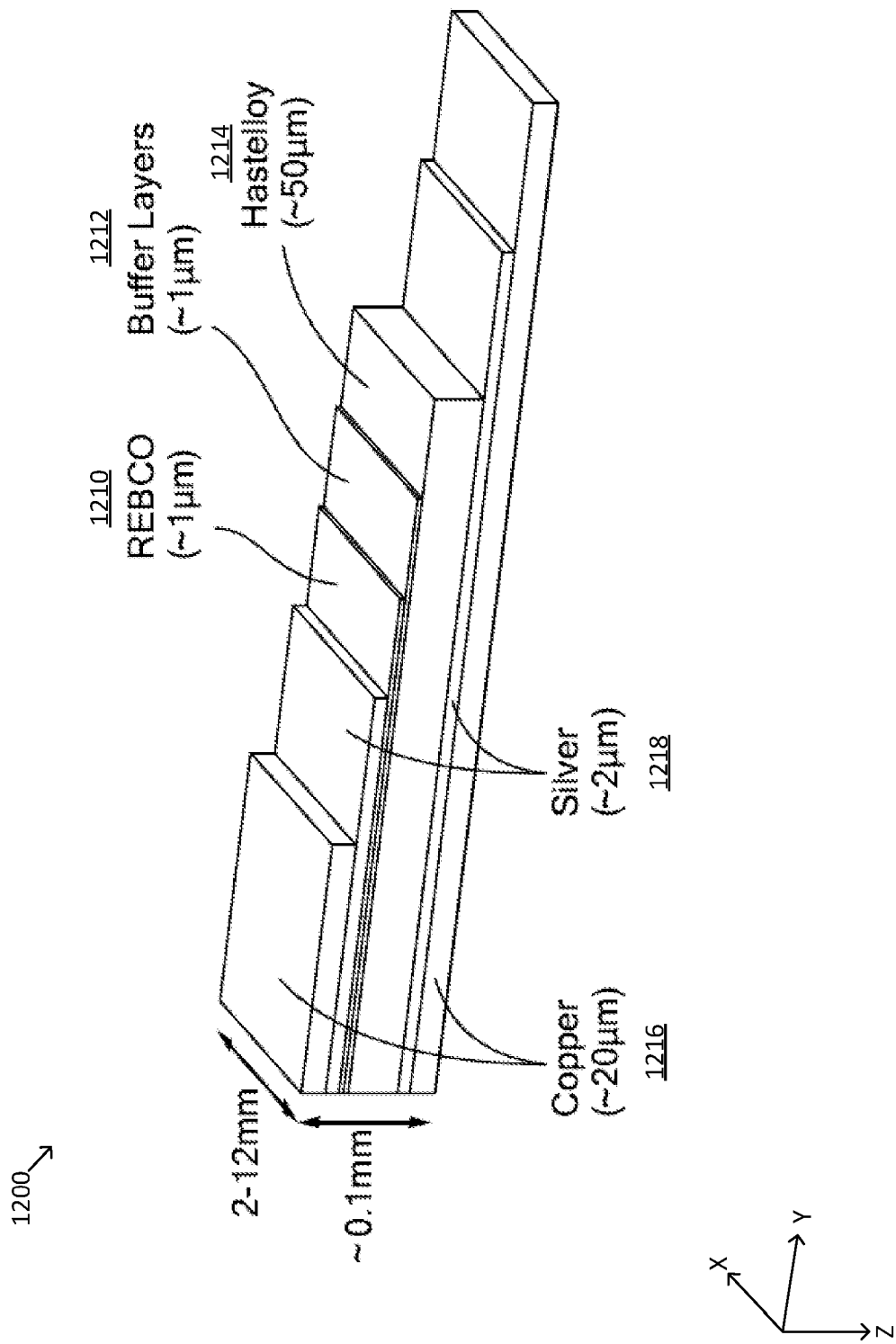
FIG. 12 depicts a cross-sectional view of the layers of an illustrative coated-conductor HTS tape, according to some embodiments.

In some embodiments, a superconducting magnet may comprise an HTS tape that is wound around a winding axis such that the x-axis of the tape as shown in FIG. 12 is aligned parallel to the winding axis. In the case of a non-insulated magnet design, for instance, each HTS tape may therefore contact the face (the x-y plane in FIG. 12) of adjacent tapes. In some embodiments, the superconducting magnet may comprise windings of a stack of HTS tapes along with a non-superconducting material, such as steel. For example, a stack of 10-20 HTS tapes stacked face-to-face on top of a single steel tape having the same width (size in the x direction in FIG. 12) as the HTS tape may be wound together around a central structure to produce a magnet, with the stack passing through one or more structural partitions along the winding.

In some embodiments, a superconducting magnet may comprise an HTS tape (or stack of HTS tapes) arranged in a racetrack spiral, with the spiral passing through one or more structural partitions along the winding.

In some embodiments, the housing of a superconducting magnet may include an electrically conductive joint structure configured to couple the superconducting material within the housing to an external surface of the housing. During winding, the superconducting material may be electrically coupled (e.g., soldered to) such a joint structure. In some cases, the housing may include multiple joints, such as a joint at an interior of the winding of the superconducting material and at an exterior of the winding of the superconducting material.

In some embodiments, a superconducting magnet may include multiple separate windings of a superconducting material that are coupled together. In some cases, the housings of each windings may be stacked or otherwise assembled together with electrically conductive joints on each housing providing for electrical coupling between the windings. As a result, a conductive path may be formed through the windings, e.g., from the inside to the outside of a winding in a first housing, through joints to the outside of a windings in a second housing, from the outside to the inside of a winding in the second housing, etc. For at least some use cases, the housings in such an assembly may be referred to herein as "pancakes," referencing their generally circular and flat shape.

In some embodiments, a stack of separately housed windings as described above may be coupled to one or more cooling plates. The cooling plates may provide for conduction cooling and may comprise a thermally conductive material, such as copper. In some embodiments, the cooling plates may be interspersed between adjacent housings, with the cooling plates being electrically insulated from the joints between the adjacent housings.

Following below are more detailed descriptions of various concepts related to, and embodiments of, techniques for lowering strains applied to superconducting material in a superconducting magnet. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 depicts a cross-sectional view of a superconducting magnet comprising structural partitions, according to some embodiments. Magnet 100 includes a housing 110 which comprises an upper plate 111, lower plate 112, and a central structure 113 that may comprise an inside diameter electrical joint. A single continuous piece of HTS tape 115 is wound around the central structure 113. Alternatively, several coupled pieces of HTS tape may be wound together as a single winding. Due to the cross-sectional view shown in FIG. 1, the same HTS tape is shown in successive windings at different radii from the central structure. The magnet 100 also includes structural partitions (hereinafter "partitions") 121 and 122, through which the HTS tape 115 passes as it winds around the central structure. The locations where the HTS tape 115 passes through the partitions are not shown in FIG. 1 for clarity, although partitions 121 and 122 may include a feedthrough slit for the HTS tape 115 to pass through as discussed above.

Figure 3C:
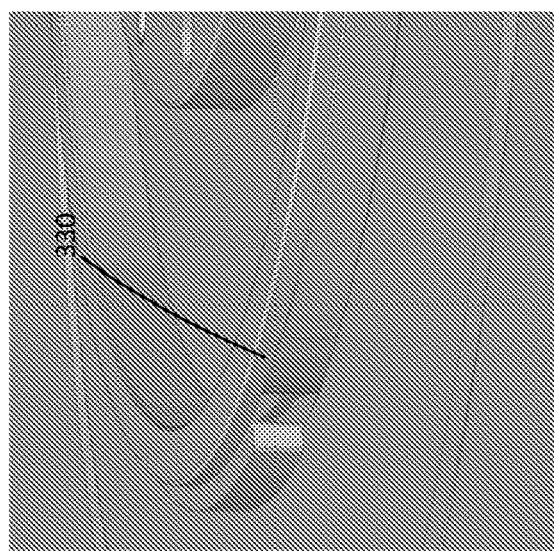
FIGS. 3A-3C depict various configurations of a feedthrough slit in a structural partition, according to some embodiments.
Figure 3B:
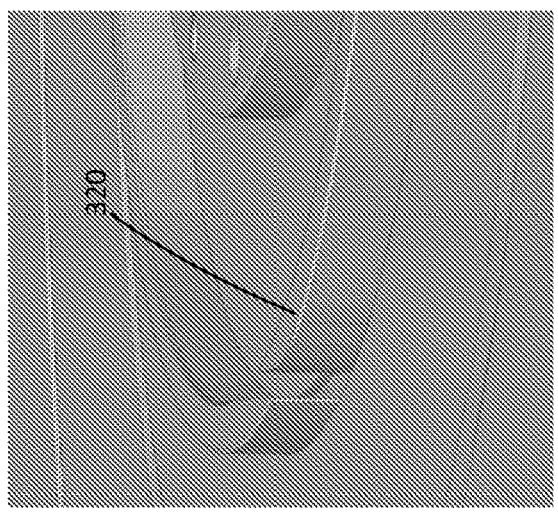
Figure 3A:
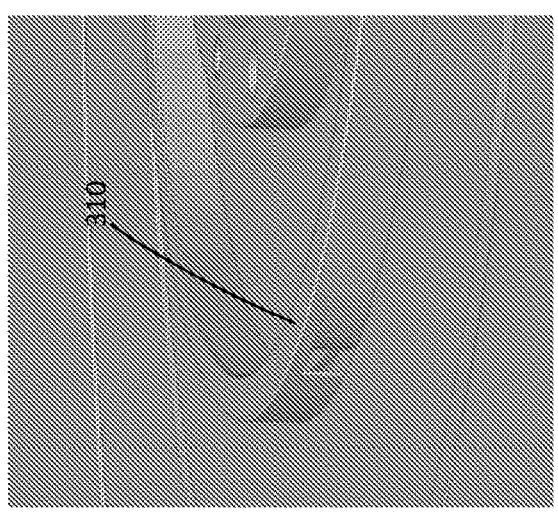

In some embodiments, the partitions 121 and 122 may be movable within the housing 110 so that a feedthrough slit within the partition may be aligned with the HTS tape at the point where the HTS tape has filled an interior of the partition. Illustrative feedthrough slits are shown in FIGS. 3A-3C and described below in more detail. Since the azimuthal position at which the tape needs to pass through the partition may be unknown, a partition that can be moved during winding may be advantageous so that the feedthrough slit in the partition is arranged at the necessary azimuthal position when the tape has filled up the space inside the partition. In some cases, a partition may be movable in a limited fashion due to it being placed within a slot, or being otherwise restricted in its motion to some extent, while still allowing the partition to be maneuvered into a desired azimuthal position.

According to some embodiments, partitions 121 and 122 may be circular, so that the same cross-sectional view of FIG. 1 may be evident at any chosen cross-section through the center of the magnet 100 (except for the cross-sections that include the slits through the partitions, which would include the slit and appear different from FIG. 1). In some embodiments, partitions 121 and 122 may be non-circular, and may instead have a shape such as rectangular, or rectangular with rounded corners (e.g., a racetrack shape), elliptical, or any other suitable shape.

According to some embodiments, the upper plate 111 and the lower plate 112 may comprise, or may consist of, a high mechanical strength material such as but not limited to steel, Inconel®, Nitronic® 40, Nitronic® 50, Incoloy®, or combinations thereof. In some embodiments, partitions 121 and 122 may comprise, or may consist of, a high mechanical strength material such as but not limited to steel, Inconel®, Nitronic® 40, Nitronic® 50, Incoloy®, high entropy alloys, high strength composites, ceramics, or combinations thereof.

According to some embodiments, the HTS tape 115 may comprise a rare earth barium copper oxide superconductor (REBCO), such as yttrium barium copper oxide (YBCO). In some embodiments, the HTS tape may comprise a long, thin strand of HTS material with cross-sectional dimensions in the range of about 0.001 mm to about 0.1 mm in thickness (or height) and a width in the range of about 1 mm to about 12 mm. According to some embodiments, each strand of HTS tape may comprise an HTS material such as REBCO in addition to an electrically conductive material. In some embodiments, the electrically conductive material may be disposed on the REBCO. In some embodiments, the electrically conductive material may be a cladding material such as copper. In some embodiments, HTS tape may comprise a polycrystalline HTS and/or may have a high level of grain alignment.

In some embodiments, the HTS tape 115 may be co-wound with a non-superconducting material, such as steel or copper. A stack of HTS tapes may be co-wound with one or more layers of the co-winding material. In some embodiments, additional conductive materials may be included in magnet 100 to fill potential gaps between components. For instance, a soft metal such as indium may be arranged between either the upper plate 111 or lower plate 112 and the HTS tape.

While a central structure 113 is shown in FIG. 1 as being solid throughout, it will be appreciated that a structure as shown in the figure is not a necessary component of the magnet 100 and in general the magnet may include any central structure in the housing. For example, the central structure 113 may instead be a cylinder with a void inside a wall around which the HTS tape can be wound.

Figure 2A:
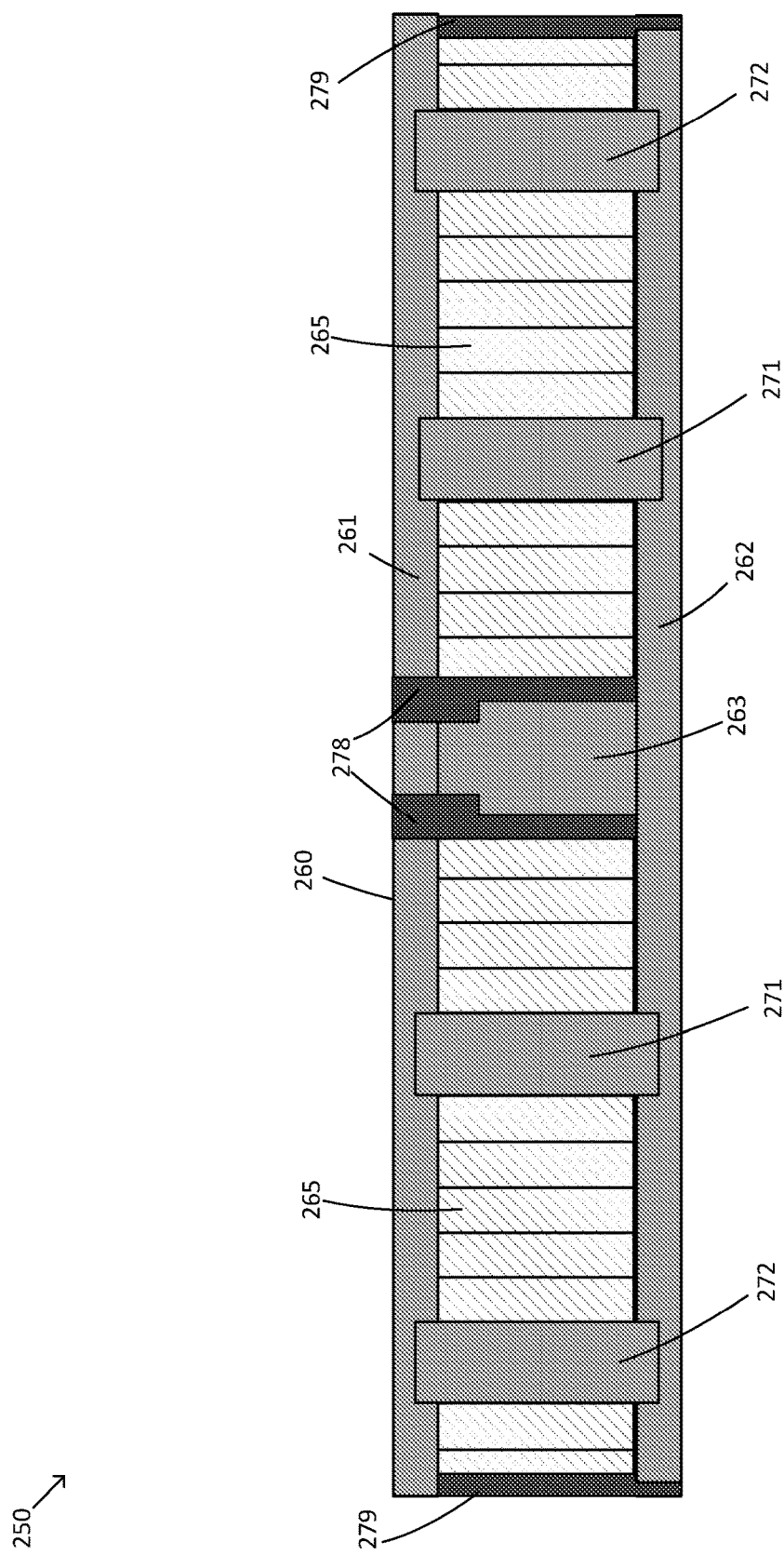
FIG. 2A depicts a cross-sectional view of a superconducting magnet comprising structural partitions arranged in grooves, according to some embodiments.

FIG. 2A depicts a cross-sectional view of a superconducting magnet comprising structural partitions arranged in grooves, according to some embodiments. Magnet 250 includes a housing 260 which comprises an upper plate 261, lower plate 262 and a central structure 263 that may comprise an inside diameter electrical joint 278. A single continuous piece of HTS tape 265 is wound from the inside diameter electrical joint 278. Alternatively, several coupled pieces of HTS tape may be wound together as a single winding. Due to the cross-sectional view shown in FIG. 2A, the same HTS tape is shown in successive windings at different radii from the central structure. The magnet 250 also includes partitions 271 and 272, through which the HTS tape 265 passes as it winds around the central structure. The locations where the HTS tape 265 passes through the partitions are not shown in FIG. 2A for clarity, although partitions 271 and 272 may include a feedthrough slit for the HTS tape 265 to pass through as discussed above.

In the example of FIG. 2A, the partitions 271 and 272 are arranged in grooves formed in the upper and lower plates 261 and 262. The grooves may act as retaining features to hold the partitions in place during assembly, and/or may provide additional structural strength to the magnet allowing forces applied to the partitions to be more readily transferred to the plates 261 and 262. In some embodiments, the grooves formed in the face of the upper and lower plates 261 and 262 may have a circular shape. In other cases, the grooves formed in the face of a plate may have a different shape, such as a rectangular shape or rectangular with rounded corners.

In the example of FIG. 2A, magnet 260 includes electrically conductive joint structures (hereinafter "joints") 278 and 279, which as discussed above are structures configured to couple the HTS tape within the magnet to an external surface. During winding, the HTS tape 265 may be electrically coupled (e.g., soldered to) the inner joint 278 and to the outer joint 279. In the example of FIG. 2A, the inner joint 278 couples the electrically conductive path of the HTS tape 265 to the upper surface of the magnet 250, whereas the outer joint 279 couples the electrically conductive path of the HTS tape 265 to the lower surface of the magnet.

In some embodiments, the inner joint 278 may not extend to the top of the housing as shown in FIG. 2A in every cross-section. In some cases, the inner joint 278 may extent to only part of the top of the housing, such as around one side of the housing. Similarly, in some embodiments, the outer joint 279 may not extend to the bottom of the housing as shown in FIG. 2A in every cross-section. In some cases, the outer joint 279 may extent to only part of the bottom of the housing, such as around one side of the housing. These configurations may have a benefit of allowing additional elements to be inserted next to the housing while still allowing an electrically conductive path to exit the magnet via the joint.

While a central structure 263 is shown in FIG. 2A, it will be appreciated that a structure as shown in the figure is not a necessary component of the magnet 250 and in general the magnet may include any central structure in the housing. For example, the central structure 263 may instead be a cylinder consisting of only the inside diameter electrical joint 278 with a void inside a wall around which the HTS tape can be wound.

Figure 2B:
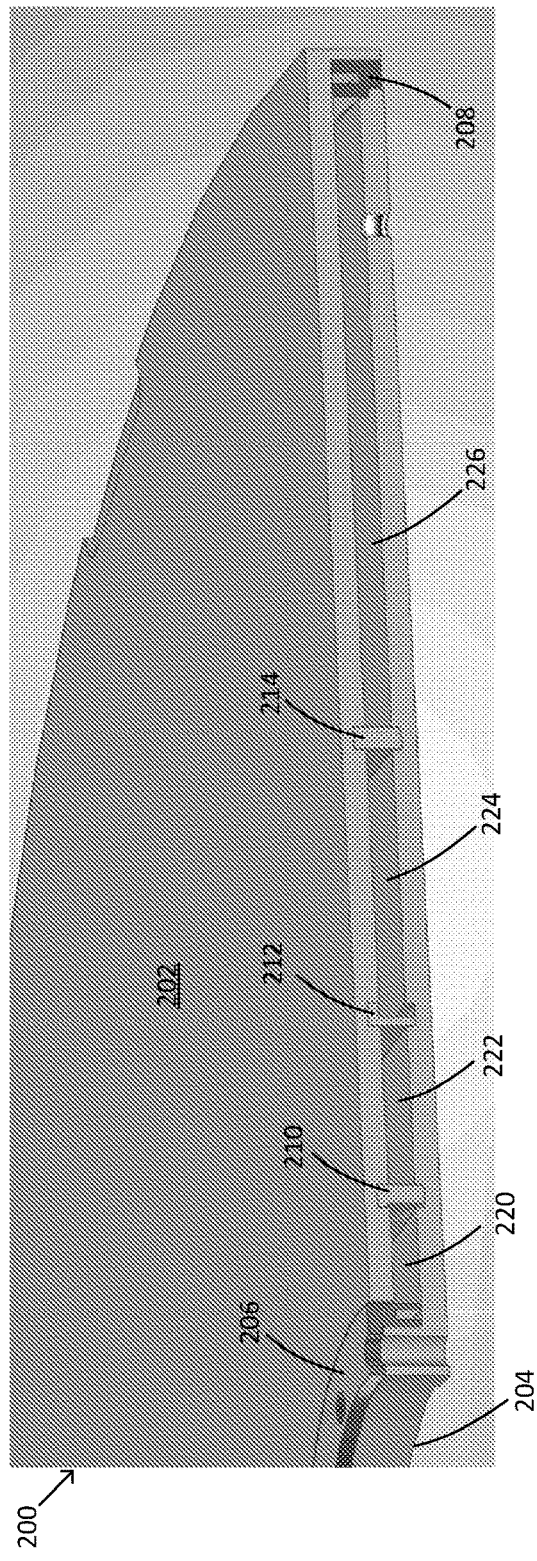
FIGS. 2B and 2C depict cross-sectional perspective view of an illustrative housing, according to some embodiments.
Figure 2C:
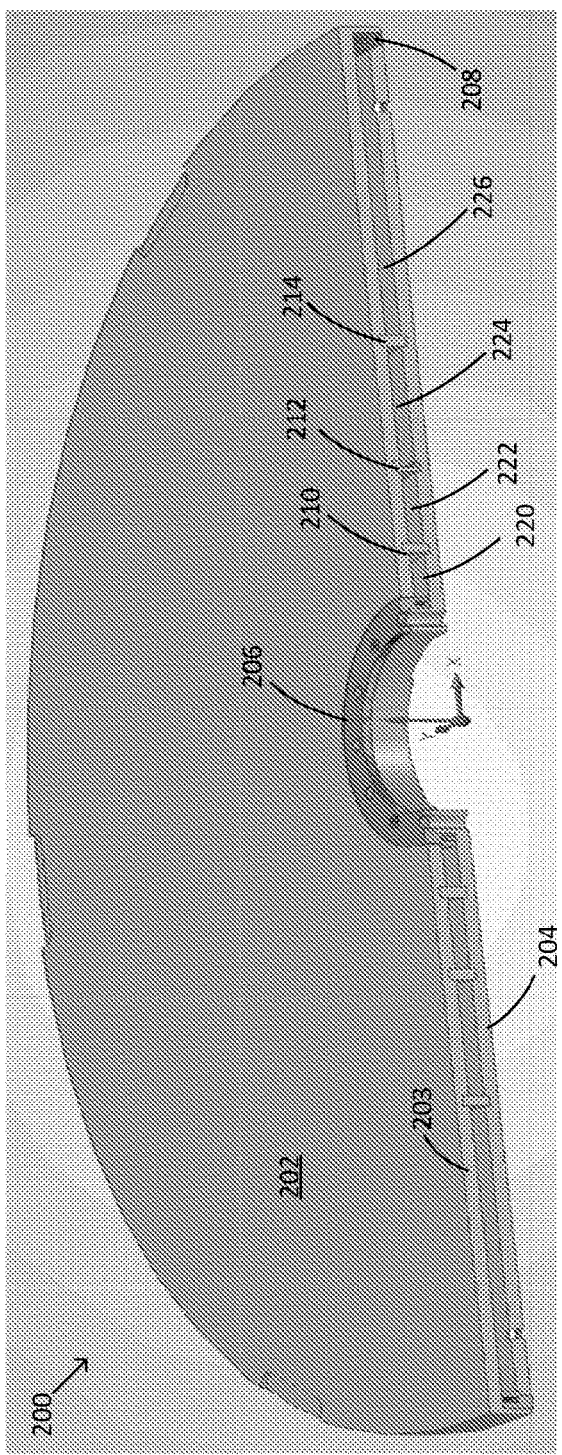

FIGS. 2B and 2C depict cross-sectional perspective view of an illustrative housing (or "pancake") configured as in FIG. 2A wherein the housing is circular and includes circular grooves and circular partitions arranged within the grooves. FIG. 2B shows a close-up version of one side of the housing, though the same structure is depicted in both FIGS. 2B and 2C. In the example of FIGS. 2B-2C, magnet 200 comprises a housing 202 that includes upper plate 203, lower plate 204, and partitions 210, 212 and 214. The magnet also include an inner joint 206 and an outer joint 208.

In the example of FIGS. 2B and 2C, the magnet 200 comprises three structural partitions 210, 212, and 214. According to some embodiments, these partitions may reduce hoop strains accumulated in the HTS tape over multiple turns when exposed to high Lorentz forces. As shown in FIGS. 2B-2C, structural partitions 210, 212, and 214 are nestled in slots or grooves formed in the top and bottom structural plates 203 and 204. The radial positions of the slots and their associated structural partitions 210, 212, and 214 may be obtained by computational analysis so that accumulated operational tape strains do not exceed allowable limits. Conversely, the number of partitions may be minimized so that space within the housing is not taken up with an unnecessary number of partitions that could otherwise be occupied by HTS tape. The spaces between the partitions into which HTS tape may be arranged, namely spaces 220, 222, 224 and 226 in the example of FIGS. 2B and 2C, may be referred to hereinafter as "channels."

In the example of FIGS. 2B and 2C, each structural partition 210, 212, and 214 comprises a feedthrough slit for transitioning the tape stack radially from one side of the partition to the other. Illustrative examples of suitable feedthrough slit structures are described below. As shown in FIGS. 2B and 2C, therefore, at least one of the pancakes in a magnet assembly may comprise a plurality of channels separated by one or more partitions for bearing radial loads, each channel having one or more turns of the HTS tape and each partition having a feedthrough connecting the turns of the HTS tape in neighboring channels. Using the feedthrough slit, a continuous length of HTS tape or tape stack can be wound from the inside diameter to the outside diameter while passing through, yet being structurally supported by, the partitions.

It may be appreciated that the number of partitions in a pancake, and thus the number of channels in the pancake, may be adjusted. Reasons for such adjustment include accommodating variations in, among other things: the diameter of the pancake; the materials used in the construction of the pancake, including the partitions themselves; the materials used in the HTS tapes (or stacks of HTS tapes); the magnitude of the design material stresses; the design operating temperature, magnetic field, and engineering current density (or transport current); and/or other suitable factors.

Figure 2D:
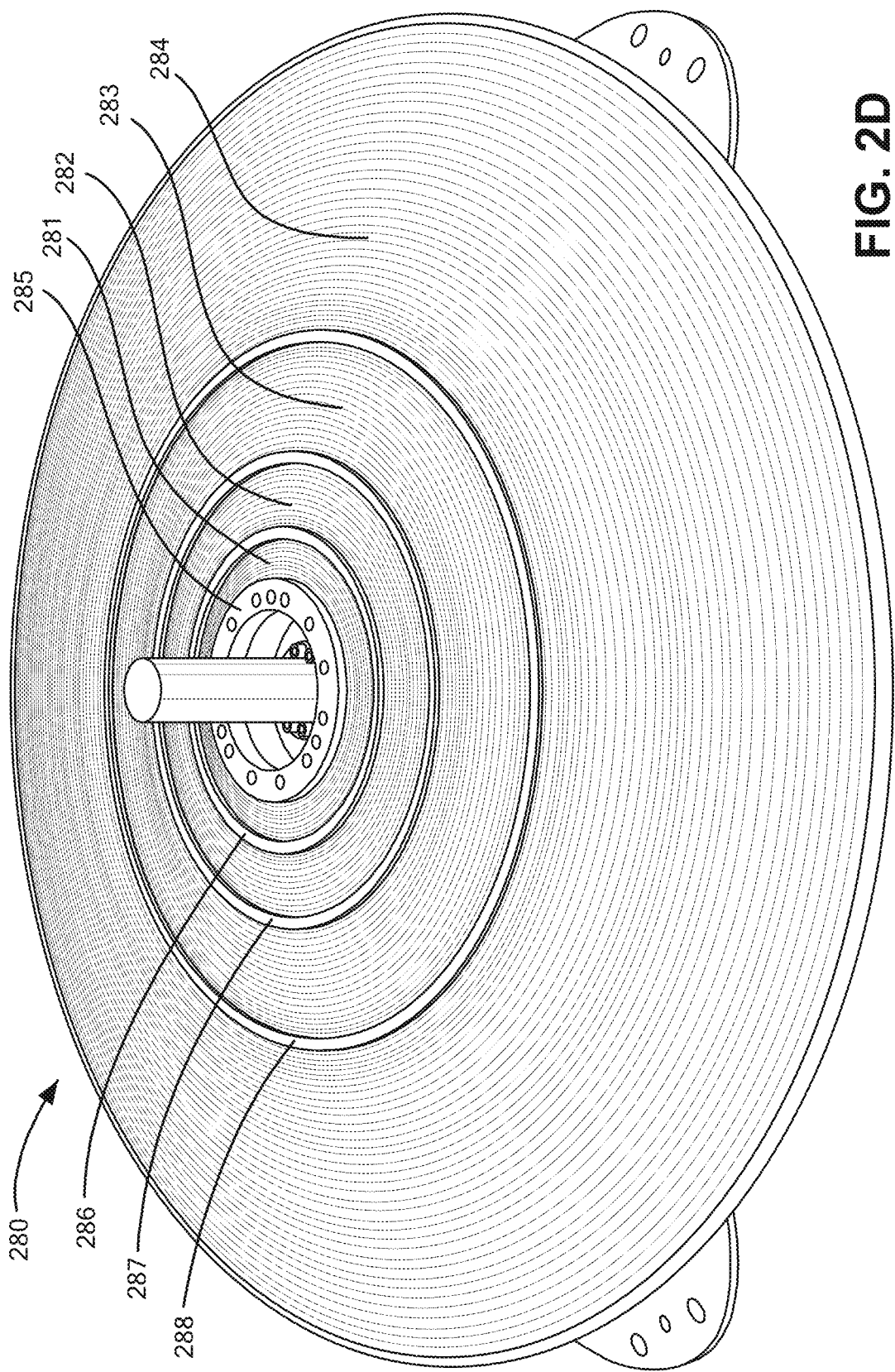
FIG. 2D is a photograph of a magnet comprising partitions and HTS tape, according to some embodiments.

FIG. 2D is a photograph of a magnet comprising partitions and HTS tape, according to some embodiments. Magnet 280 is an example of magnet 200 comprising HTS tape and with the upper structural plate removed so that the interior of the magnet can be seen. As shown in FIG. 2D, the magnet 280 includes three partitions 286, 287 and 288. Each of the three partitions includes a feedthrough slit (not clearly shown in FIG. 2D), and the HTS tape is wound from the inside of the magnet around the central structure 285 (producing tape region 281), through the partition 286, around the partition 286 (producing tape region 282), through the partition 287, around the partition 287 (producing tape region 283), through the partition 288, and around the partition 288 (producing tape region 284). In the example of FIG. 2D, the central structure 285 consists of only an inside diameter electrical joint, as described above.

FIGS. 3A-3C depict various configurations of a feedthrough slit in a structural partition, according to some embodiments. Each of FIGS. 3A-3C depicts a circular partition arranged within a circular slot of a structural plate. It may be appreciated that while the illustrative feedthrough slits are depicted for circular partitions and a circular slot, the same types of slit designs may also be realized in partitions of other shapes (such as rectangular), and/or may be realized in partitions that are not arranged in a slot within the structural plate.

In the example of FIG. 3A, the partition includes a partial slit configuration 310 in which the slit does not extend through the entire height of the partition. In the example of FIG. 3B, the partition includes a full slit configuration 320 in which the slit does extend through the entire height of the partition. In the example of FIG. 3C, the partition includes a partial slit configuration 330 for a partition with a spiral machined in its outside diameter, so that the partition is not purely circular but rather in the shape of a spiral of approximately one full turn. The configuration of FIG. 3C may include a partition with a radially uniform thickness that is able to bear radial loads equally in all azimuthal directions.

While FIG. 3C depicts a partition have a spiral machined in its outer diameter, but circular in its inner diameter, another suitable configuration for a partition would have the shape of a spiral in both its inner and outer diameters. It is appreciated that other slit configurations may be used in accordance with embodiments of the concepts, techniques, and structures disclosed herein, and in particular to alleviate radial stresses.

As noted above, while embodiments herein are not limited to a circular partition arranged within a circular slot, there may be an advantage to such a configuration in that the partition may be rotatable within the slot during winding of the magnet. Since the azimuthal position at which the tape needs to pass through the partition may be unknown, the circular partition and circular slot arrangement allows the partition to be rotated during winding so that the feedthrough slit in the partition is arranged at the necessary azimuthal position when the tape has filled up the space inside the partition.

As discussed above, in some embodiments a high field superconducting magnet may be formed by turns of an HTS, HTS tape, or HTS tape stack arranged in flat layers (e.g., such that contacting surfaces of the layers are orthogonal to a central longitudinal axis of the magnet about which the layers are disposed), and such an arrangement may be referred to as "pancake-wound" or even more simply "a pancake." Thus, a pancake includes both an HTS component and a structural component for housing the HTS. If a magnet is formed by layers with turns (e.g., such that contacting surfaces of the layers are parallel to a central longitudinal axis of the magnet about which the layers are disposed), such an arrangement may be referred to as a "a layer-wound scheme" or simply "a layered configuration" or even more simply "layered."

Figure 4A:
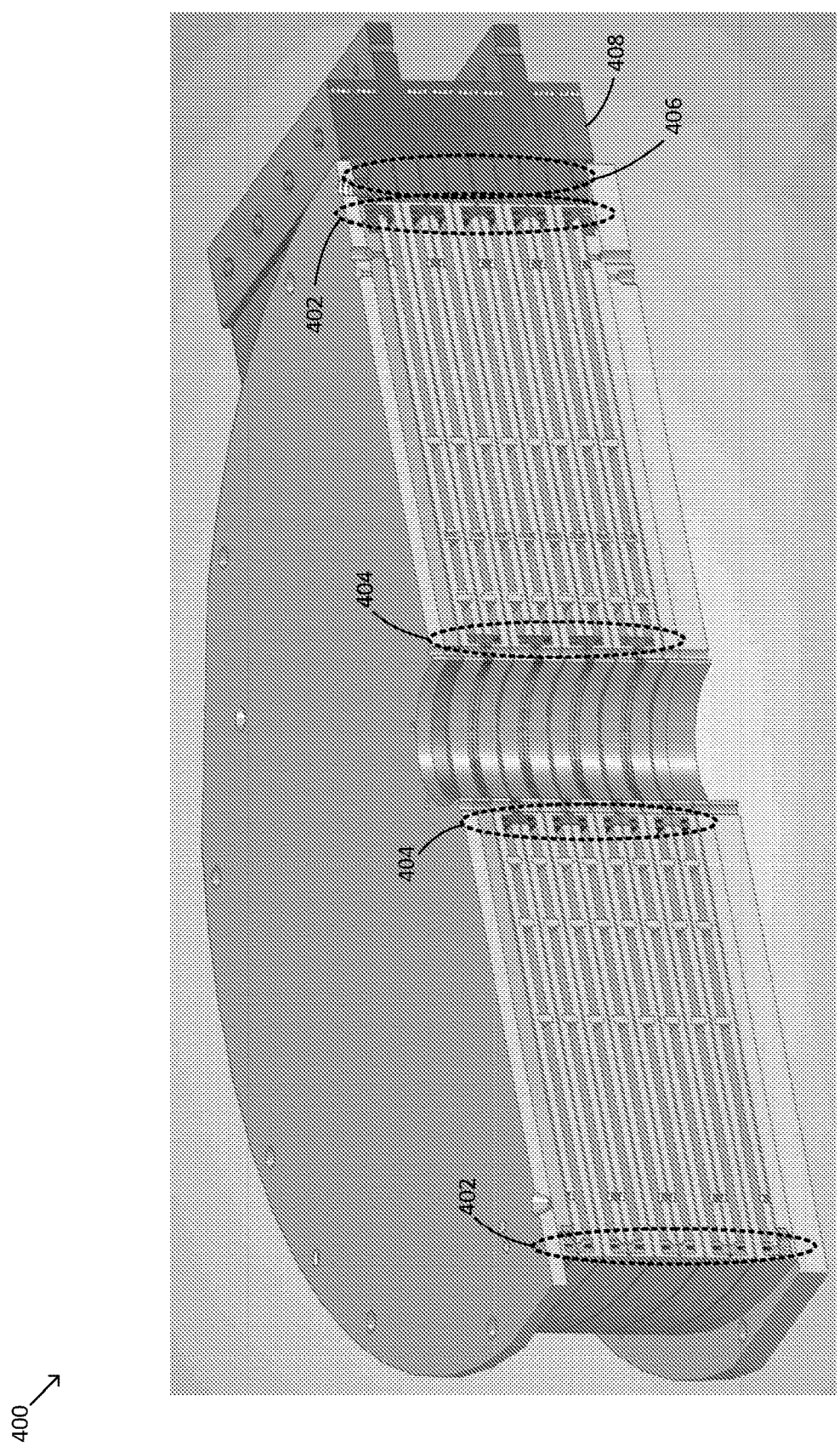
FIG. 4A shows a cross sectional view of a magnet assembly, according to some embodiments.
Figure 4B:
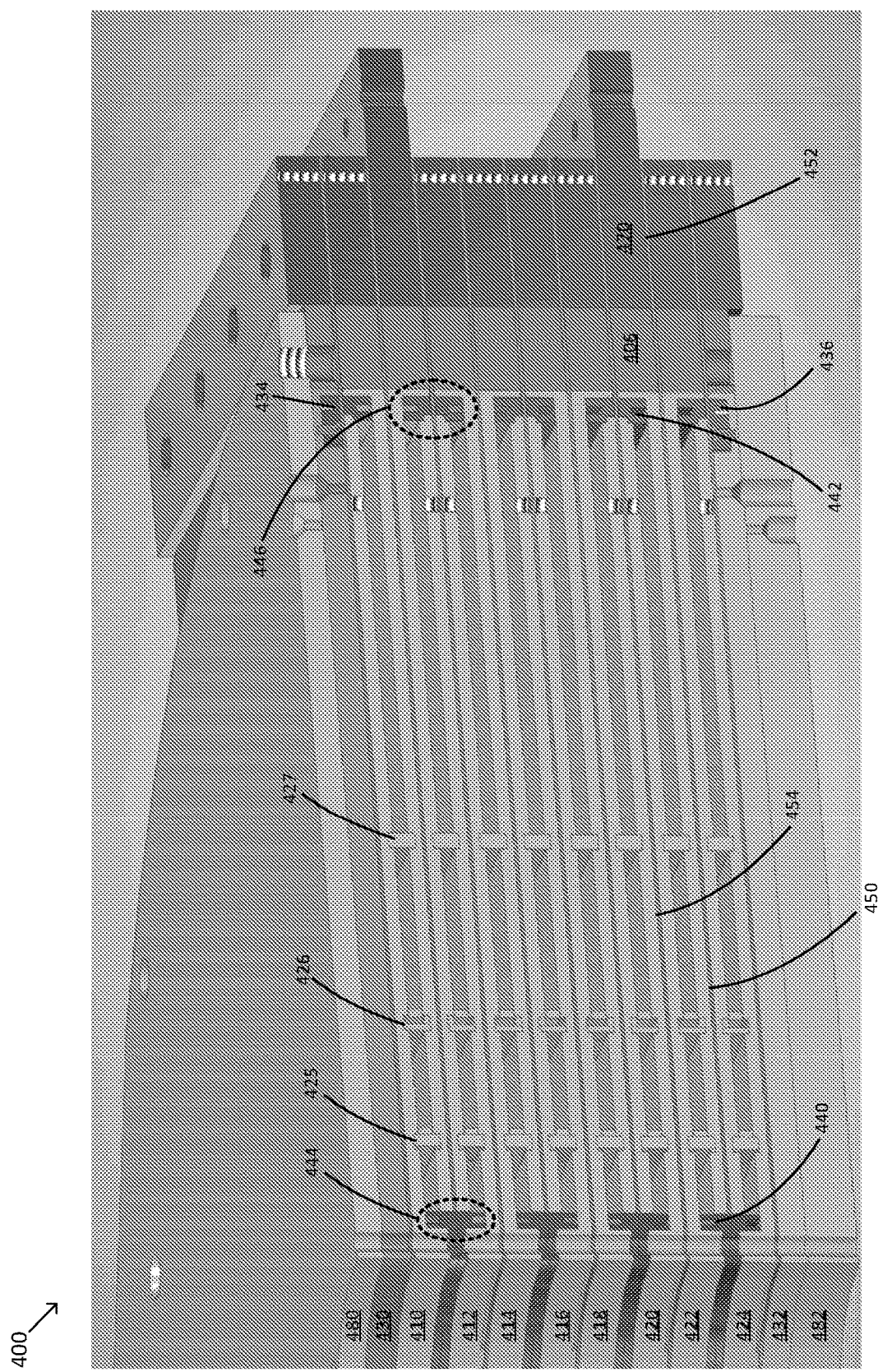
FIG. 4B depicts an enlarged portion of the cross sectional view of FIG. 4A, according to some embodiments.

FIG. 4A shows a cross sectional view of a magnet assembly 400, and FIG. 4B shown an enlarged portion of the cross sectional view, according to some embodiments. According to some embodiments, magnet assembly 400 may be designed for use in a high magnetic field (e.g., 10 Tesla or more). According to some embodiments, the magnet assembly 400 may be comprised of a conduction cooled "cold mass" of multiple pancakes having outside diameter (OD) electrical joints 402 and inside diameter (ID) electrical joints 404. In embodiments described in detail herein, the mechanical structure of each pancake that retains HTS (hereafter the "housing") may be formed of or comprise steel, or any other suitable structural, electrical conductor like an austenitic nickel-chrome alloy such as an INCONEL® alloy from Special Metals Corporation of New Hartford, New York or a nitrogen-strengthened austenitic stainless steel such as a NITRONIC® alloy from AK Steel of West Chester, Ohio. However it is appreciated that in other embodiments, the housing may be formed of other structural materials that may or may not be electrical conductors. In the example of FIG. 4, the magnet assembly 400 is coupled to transfer or otherwise remove heat via thermal conduction using a cooling apparatus at a terminal 408 that is electrically insulated from the magnet assembly by an electrical insulator 406 (such as a high-pressure fiberglass laminate).

Though the example of FIGS. 4A-4B depicts a particular, electrically non-insulated pancake design, it is appreciated that many of the features and manufacturing techniques disclosed herein are applicable to magnets formed by fully or partially insulated HTS tapes or tape stacks, and that a person having ordinary skill in the art would understand how to adapt the concepts, techniques, and structures taught herein to fully or partially insulated designs. For example, a magnet assembly need not include the same number of partitions in each pancake, and need not include pancakes at the same radii in each pancake, as shown in the example of FIGS. 4A-4B.

FIG. 4B depicts an enlarged portion of the cross sectional view of FIG. 4A. In the example of FIG. 4B, the magnet assembly 400 includes two types of pancakes, referred to herein as "regular" pancakes and "terminal" pancakes. Regular pancakes 410, 412, 414, 416, 418, 420, 422, and 424 each may be formed from a pair of structural plates having structural partitions between them. These partitions define a plurality of channels for retaining one or more turns of HTS tape, or tape stack, that produce a magnetic field when an electrical current is applied, as discussed above. (The HTS tape stack is not shown in FIGS. 4A-4B to provide more visual clarity to the structure of the pancakes themselves. That is, only the housings are shown.)

In the example of FIG. 4B, the pancake 410 comprises three partitions 425, 426, 427 from the inside diameter outward, and this partition design is replicated in the other regular pancakes of the stacked magnet assembly 400. The turns of the HTS stack form a continuous spiral in the channels of each pancake, electrically connecting its inside diameter to its outside diameter. According to some embodiments, the HTS tape of at least one of the pancakes may comprise a rare-earth copper oxide, such as REBCO. It is appreciated that other superconducting materials may be used within the magnet assembly 400 for generating magnetic fields in accordance with embodiments of the concepts, techniques, and structures disclosed herein.

According to some embodiments, HTS tape and co-wound materials within magnet assembly 400 can be left free standing, tightly packed in the structure of the pancake so that one or more turns of the HTS tape stack in each of the channels substantially fill the volume of the channel. Alternately, the HTS tape of at least one of the pancakes can be soldered into at least one of the plurality of channels, and is soldered into the one or more joints. It is appreciated that other methods may be used to secure a superconducting tape or tape stack within the magnet assembly 400 in accordance with embodiments of the concepts, techniques, and structures disclosed herein.

According to some embodiments, to increase quench stability due to small resistive heating in the joints, and possible overstraining and/or overstressing the tape in joints and channel-to-channel transitions through the structural partitions within each pancake, copper co-wind can be added in these critical areas. To reduce quench-related temperature rise by inductively picked-up eddy current heating of copper fractions in joints, current leads, and channel-to-channel transitions, the HTS tape stack can be reinforced by adding in-line HTS tapes to provide more current-carrying capacity. Furthermore, to reduce possible kinking of the HTS tapes stack in in joints, current leads, and channel-to-channel transitions, the HTS tape stack can be reinforced by steel tape co-wind. Additional co-wind may be added. For example, copper co-wind can be added to enhance normal zone propagation through the partition during a quench, or for other purposes.

According to some embodiments, each of the pancakes of magnet assembly 400 may include one or more joints for electrically coupling the one or more turns of its HTS tape as part of an electrical circuit. More concretely, ring-shaped joints, embedded into the structural plates, may be located at the inside diameter and the outside diameter of each regular pancake, terminating the superconducting electrical path. These joints may comprise, or may consist of, copper and/or another electrically conductive material, and/or may comprise, or may consist of, superconducting material. Illustratively, regular pancake 422 has an inside diameter joint 440 and an outside diameter joint 442. The HTS tape stack spiral continues into grooves in these joints. In illustrative embodiments, the spiral is terminated after a plurality of complete 360-degree turns, while in other embodiments the grooves are terminated before or after one full turn.

According to some embodiments, inside diameter and outside diameter joints 440 and 442, respectively, may be embedded into the structural plates of each pancake so that they are flush with, or slightly extend above, the flat surface of the structural plates on its opposite sides. In particular, the joints may extend above the structural plates to provide adjacent space for cooling plates, as described below. In accordance with the modular design disclosed herein, the number of regular pancakes can be any number greater than or equal to one pancake, to produce a desired magnetic field.

In the example of FIGS. 4A and 4B, a plurality of identical regular pancakes may be stacked together with alternating axial orientation of the HTS tape-filled channels. This arrangement may provide a continuous electrical path between the exposed joints of the two outermost pancakes, via HTS tape spirals and mated ID-to-ID and OD-to-OD joints of all pancakes of the magnet assembly 400. In detail, a pattern of alternating housings may be repeated where one of the pancakes is electrically coupled by the joint on its outside diameter to a joint on the outside diameter of a second one of the pancakes, and the first one of the pancakes is electrically coupled by the joint on its inside diameter to a joint on the inside diameter of a third one of the pancakes. Illustratively, in FIG. 4B the outside diameter joint of the first pancake 412 and the outside diameter joint of the second pancake 414 are mated via electrical coupling region 446, while the inside diameter joint of the first pancake 412 and the inside diameter joint of the third pancake 410 are mated via electrical coupling 444. To facilitate better electrical contact of pancake-to-pancake joints, during manufacture an electrically conductive (e.g., indium) gasket may be inserted between the respective mating surfaces of the joints of two adjacently stacked pancakes.

It may be noted that, in FIG. 4B, the coupling region 446 includes a portion of the cooling plate 452 inserted between the joints in the pancakes 412 and 414. In the illustrative magnet assembly of FIGS. 4A and 4B, the outer joints between the plates make contact only on one half of the pancake, with the other half having a cooling plate inserted between the pancakes. This difference is evident from comparing the joint regions 402 on the left side of FIG. 4A, which shows the joints contacting one another, and on the right side of FIG. 4A, which shows the joints having the cooling plate inserted between them.

In the example of FIGS. 4A and 4B, the electrical path of the HTS tape winding is completed by two outermost, terminal pancakes 430 and 432. Terminal pancakes 430, 432 present a solid structural plate with only one ring-shaped joint, located either at the ID or OD at the same radial position as in the regular pancakes with which they make electrical contact. In other words, each pancake at the top of the stacked plates and at the bottom of the stacked plates comprises an interior surface having a joint on either its outside diameter or its inside diameter that is electrically coupled to a joint of another (regular) pancake, and a parallel, exterior surface lacking a joint.

In the example of FIGS. 4A and 4B, both terminal pancakes 430, 432 have respective joints 434, 436 at the OD, but only on their interior surfaces. The ring-shaped joints 434, 436 of the terminal pancakes 430, 432 are continuously connected with electrically conductive plates, of the same conductor and extended radially outward, usually in the direction of HTS current leads (e.g., electrical conductor 406 as shown in FIGS. 4A and 4B). The HTS tape stack starts inside the ring of the joint, makes a 360-degreed loop in the groove of the joint, and then joggles out into a groove in the extension plate. Thus, each of the pancakes (both regular and terminal) is electrically coupled by its one or more joints to the joints of either one or two neighboring pancakes, thereby forming an operating current path that includes the HTS tape in each of the pancakes.

According to some embodiments, although ID and OD joints are described above as executed in the shape of continuous circular rings, the joints may alternatively be configured as discrete plates, made as extensions from the respective pancakes and positioned with regard to the pancakes so that they mate in the assembly and can be pressed together and secured either individually, one joint at a time, or all together in the cold mass assembly, as described above.

According to some embodiments, since pancakes are independent from each other and are connected for electrical operation only at the joints, the shape of individual pancakes can be different, as long as joints of adjacent pancakes have mating surfaces. In general, the cold mass and the HTS winding can be shaped as a solenoid or a racetrack or can have a different shape that is topologically compliant with either of these. Thus, at least two of the pancakes may have different sizes or different shapes. It is expected that a person having ordinary skill in the art may conceive of other sizes or shapes without deviating from the concepts and techniques disclosed herein.

According to some embodiments, the cold mass may be conduction cooled by thermally conductive (e.g., copper, aluminum, silver, gold, graphine, etc.) cooling plates inserted between the pancakes in the space not already filled by the joints. In the example of FIGS. 4A and 4B, copper cooling plates 450 are positioned between adjacent regular pancakes 422 and 424, and this design of alternating pancakes and cooling plates is repeated throughout the magnet assembly 400 as shown. In some embodiments, copper cooling plates may be electrically insulated to prevent electrical shorts between the pancakes. This insulation may be accomplished by coating each surface with a layer of electrical insulator, such as polytetrafluoroethylene (PTFE) or similar, and solidifying the insulator. It is appreciated that other coatings may be used.

Each of the copper cooling plates 450 may be thermally conductive, and may be arranged to pass from between the pancakes through a layer of electrical insulator to a terminal for thermally coupling the cooling plate to a cooling apparatus. In the example of FIGS. 4A and 4B, the copper cooling plates 450 have terminals 452 in thermal contact with a terminal 470 of the cooling apparatus. In this way, each of the pancakes is adjacent to either one or two of the cooling plates, allowing the pancake to be cooled to an operating temperature, and allowing the pancake to transfer heat produced in the pancake via thermal conduction to the cooling apparatus. Concretely, each terminal pancake is adjacent to one of the cooling plates, and each regular pancake is adjacent to two of the cooling plates.

According to some embodiments, when an HTS is passed through a feedthrough slit of a structural partition, additional material may be supplied other than the HTS tape to fill any gaps in the feedthrough. This additional material, may mitigate any degradation of the tape due to deformation caused by pressure and/or other forces during operation of the magnet. Since the HTS tape in the slit may be comparatively thin, it may be particularly susceptible to deformation, and adding "shimming" material placed at the feedthrough may avoid such deformation.

Figure 5:
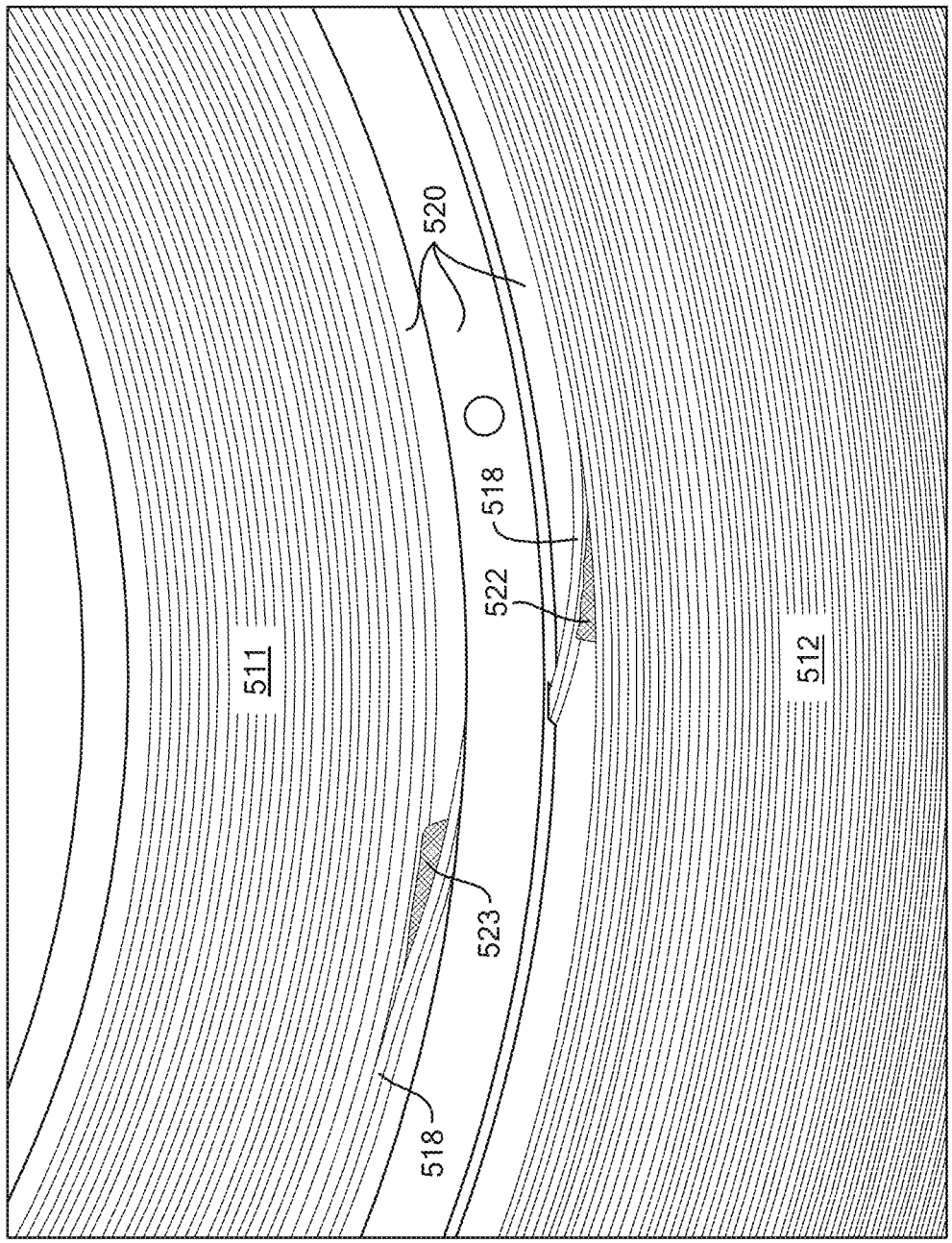
FIG. 5 is a photograph of a feedthrough slit that comprises shims in addition to HTS tape, according to some embodiments.

FIG. 5 is a photograph of a feedthrough slit that comprises shims in addition to HTS tape, according to some embodiments. In the example of FIG. 5, a magnet is shown with the upper plate removed and with HTS tape wound inside and between partitions as discussed in various embodiments above. In the example of FIG. 5, a partition 520 separates a region 511 of HTS tape windings from a region 512 of HTS tape windings, with the HTS tape passing through a slit in the partition 520. In the example of FIG. 5, the partition 520 is of the type shown in FIG. 3C, wherein the partition has the shape of a spiral with approximately one full turn. Additional shimming material 522 and 523 is inserted on either side of the partition to fill gaps that would otherwise be present when the turn of HTS tape 518 passes through the partition 520.

Shimming material 522 and 523 may include additional smaller pieces of HTS tape and/or additional strips of an electrically conductive material (e.g., strips of copper and/or strips of steel). Multiple strips of each type of material may be inserted as desired (e.g., multiple strips of HTS tape, multiple strips of copper tape and multiple strips of steel tape may all be inserted together as a single shim or "co-wind").

Figure 6:
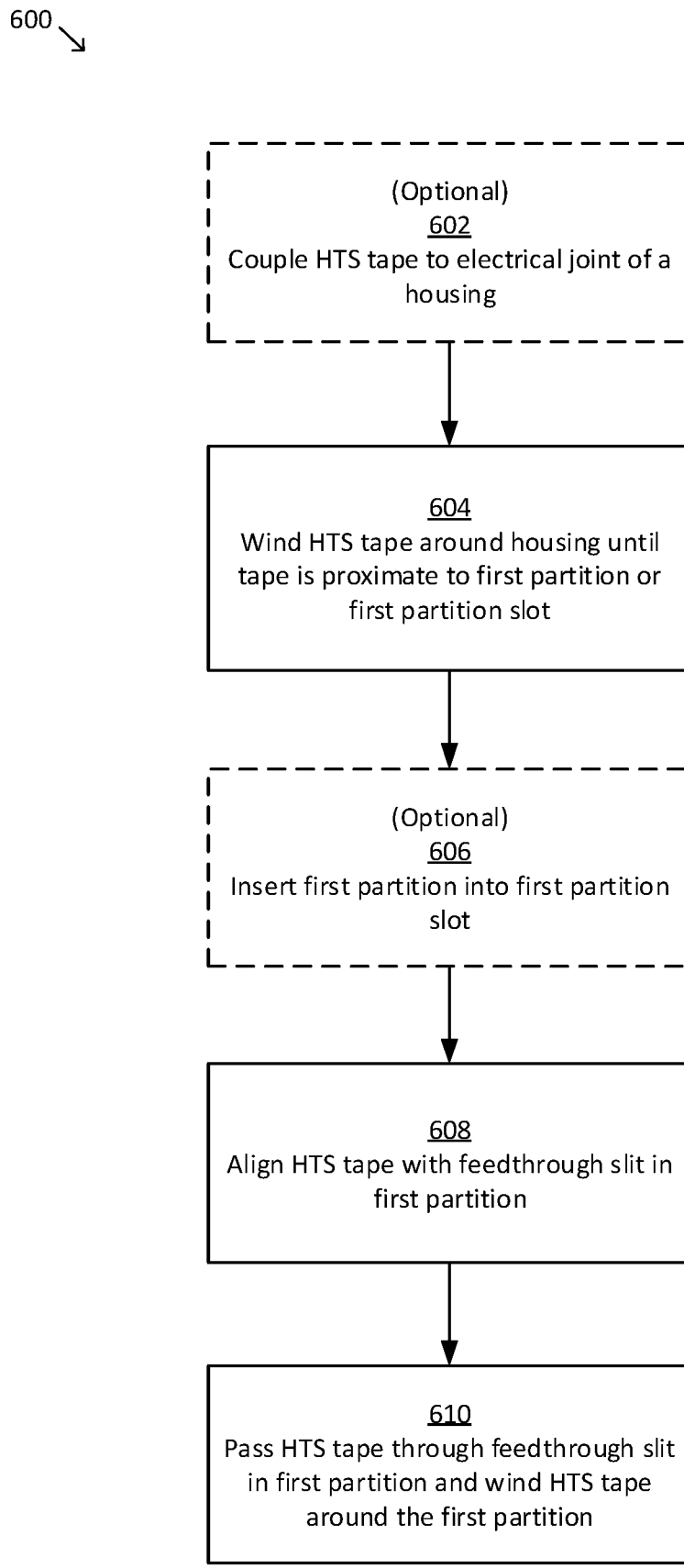
FIG. 6 is a flowchart of a method of assembling a magnet, according to some embodiments.
Figure 7:
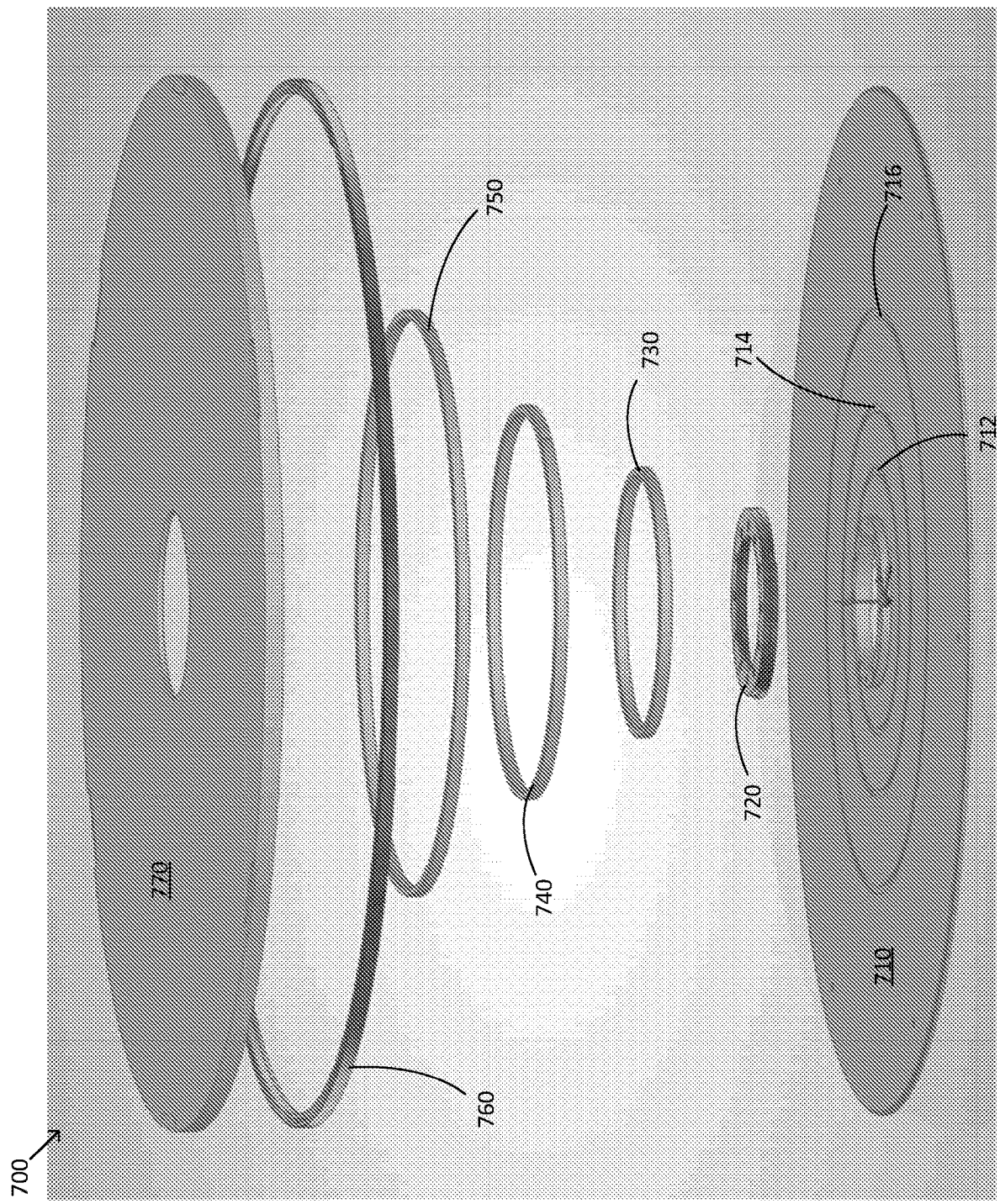
FIG. 7 shows an exploded view of structural and electrical components in a complete regular pancake, according to some embodiments.

FIG. 6 is a flowchart of a method of assembling a magnet, according to some embodiments. For purposes of illustration, method 600 will be discussed in relation to an exploded view of a magnet as shown in FIG. 7, although it will be appreciated that the method 600 is not limited to assembly of a magnet with the particular components of FIG. 7. In particular, FIG. 7 depicts circular partitions and circular structural plates comprising circular slots, yet method 600 may be practiced with any suitably shaped partitions and plates (including plates without slots, or plates with non-circular slots).

With respect to the elements of FIG. 7, the figure shows an exploded view of structural and electrical components in a complete regular pancake 500, such as those pancakes included in magnet assembly 400 shown in FIGS. 4A and 4B, or in magnet 200 of FIGS. 2B and 2C. The design shown in FIG. 7 facilitates a convenient process of manufacturing pancakes and winding an HTS tape stack into the structural plate of the pancake. The HTS tape stack may be a tape stack as described above in connection with FIGS. 4A and 4B. Manufacturing of a terminal pancake is similar; differences are pointed out below.

A pancake may be assembled by initially installing and bolting, in the lower structural plate 710, an inside diameter joint 720. The HTS stack may be already soldered into the groove in the ID joint 720, or may optionally be soldered in place after installation of the joint in act 602. At this stage in the assembly process, the radial space outside the ID joint 720 is open, and in particular no partitions are installed into slots in the lower structural plate 710.

In act 604, the stacked HTS tape may then be wound outward from the ID joint 720 in a single plane, i.e. in a manner similar to tape wound on a cassette reel. Winding from a reel of HTS tape to the pancake being manufactured in this "reel-to-reel" manner significantly simplifies the winding process. Winding continues till the accumulated radial build reaches the slot 712 of the first partition 730.

Optionally, the first partition 730 may be insertable during the winding process, rather than being fixed into the lower structural plate 710. In such cases, the partition may be inserted into the first partition slot 712 at a suitable time during winding of the HTS tape around the ID joint 720 in act 606. In such cases, the partition 730 may be inserted into the slot 712 in the lower structural plate 710, so that the gap between the tape and the partition 730 is as small as possible. In case of a circular (solenoidal) winding this is accomplished by rotating the partition 730 to place its feedthrough at the best azimuthal position to minimize this gap, i.e., the location where the circumferential winding of the HTS tape just reaches the slot 712, in act 608.

In act 610, the HTS tape stack, with the above-described optional local co-wind material (e.g., copper, steel and/or HTS tape) mitigating kink formations in the transition area, may be driven through the gap in the partition 730 to the outside diameter of the partition 730, and then the partition 730 is rotated within the slot 712 to feed tape through the feedthrough until the volume inside of the partition 730 is fully filled with tape. At this point, the partition 730 is held in place and "reel-to-reel" winding continues around the outside of the partition 730.

According to some embodiments, the first partition 730, and the other partitions 740 and 750, may comprise a feedthrough slit for the HTS tape stack to pass through, as shown in any of FIG. 3A, 3B, or 3C, or using another configuration having a feedthrough.

The procedure of acts 604, optionally 606, and acts 608 and 610, may be repeated for every partition 730, 740, and 750 until the winding reaches the position of the outside diameter joint 760. After its installation, the HTS tape stack (with the co-wind) is inserted and soldered into the gap in the OD joint 760. Possible gaps between the winding and the partitions 730, 740, 750 or joints 720, 760 may be shimmed by copper or steel solid or comprised of one or more thin tape shims. In this way, the interior of each regular pancake may be made monolithic, with the HTS tape stacks secured into place against radial forces.

According to some embodiments, the partitions 730, 740, 750 each may extend above the top of the HTS tape windings; that is, the partitions 730, 740, 750 may have a slightly greater height than that of the wound HTS tape. In such cases, before final capping with the upper structural plate, a layer of indium can be added in the space above the wound HTS tape. Finally, the upper structural plate 770 is installed flush on top of the HTS tape, partitions, and joints. During installation, partitions 730, 740, 750 are inserted into slots on the underside of the upper structural plate 770 that are at the same radial positions as the slots 712, 714, 716 on the lower structural plate 710, thereby providing support for the partitions against radial forces accumulated during operation.

Manufacturing of the terminal pancake may comprise insertion of the OD joint 760 and copper extension plate, and soldering the HTS tape stack into the groove in the joint.

Thus, there is disclosed a housing for retaining wound tape to generate a magnetic field. The housing comprises a first structural plate 710 having one or more first circular slots 712, 714, 716. The housing also comprises one or more partitions 730, 740, 750, each such partition having a feedthrough for winding the tape from an inside diameter of the partition to an outside diameter of the partition. Each partition 730, 740, 750 is removably and rotatably inserted into a corresponding one of the first circular slots. That is to say, because the slots are circular and the partitions are designed to be accommodated within the slots, the partitions advantageously may be rotated within each slot so that their feedthroughs have any desired azimuthal location to facilitate winding, i.e. to rotate the feedthroughs in the slots to ensure that the volume inside the partitions is fully filled with tape. The housing further comprises a second structural plate 770 having one or more second slots, each partition being removably inserted into a corresponding one of the second slots. One of the partitions 730, 740, 750 may have a feedthrough slit according to any of the configurations 310, 320, or 330 shown in FIG. 3A-3C, or any other configuration conducive to passing wound tape from one side of the partition to the other side.

In summary, there is disclosed a method of winding a conductive tape to form a magnet. The method 600 includes providing a first structural plate 710 having a surface with one or more circular slots 712, 714, 716 and having, at an inside diameter thereof, a first electrical joint 720. The method next optionally includes act 602 in which the conductive tape is physically and electrically coupled to the first electrical joint 720. The method proceeds with act 604 by circularly winding the conductive tape on the surface of the first structural plate 710 until the conductive tape reaches one of the circular slots (illustratively, circular slot 712). Next, the method optionally includes act 606 in which a partition having a feedthrough slit (illustratively partition 730) is removably inserted into the one of the circular slots 712, wherein the partition 730 may be optionally rotated within the one of the circular slots 712 so that its feedthrough aligns with an azimuthal location of the wound conductive tape. The method proceeds with act 608 wherein the HTS tape is aligned with the feedthrough slit (whether by rotating the partition or otherwise), and then in act 610 wherein the conductive tape is wound on the surface of the first structural plate 710 through the feedthrough and around an outside diameter of the partition 730 to thereby minimize a gap between the conductive tape and the partition 730.

The method may continue to repeat acts 604-610 for each additional slot of the one or more circular slots (illustratively, for the additional circular slots 714 and 716 using the partitions 740 and 750, respectively). If the first structural plate 710 has, at an outside diameter thereof, a second electrical joint (illustratively joint 760), then the method may include physically and electrically coupling the conductive tape to the second electrical joint 760. The method may include adding a layer of indium adjacent to the wound conductive tape.

The method 600 may, in some embodiments, produce a pancake having a complete structural housing and wound tape by further providing a second structural plate (illustratively, plate 770) having a surface with a second circular slot; and placing the second structural plate 770 flush against the wound conductive tape so that the partition (in this case, partition 730) is removably inserted into the second circular slot. It is appreciated that the second structural plate may have slots to accommodate additional partitions (illustratively, the partitions 740 and 750) and that placing the second structural plate 770 may also removably insert these additional partitions into the corresponding slots in the second structural plate. As described above, the conductive tape may be co-wound with copper, or steel, or both copper and steel.

Figure 8:
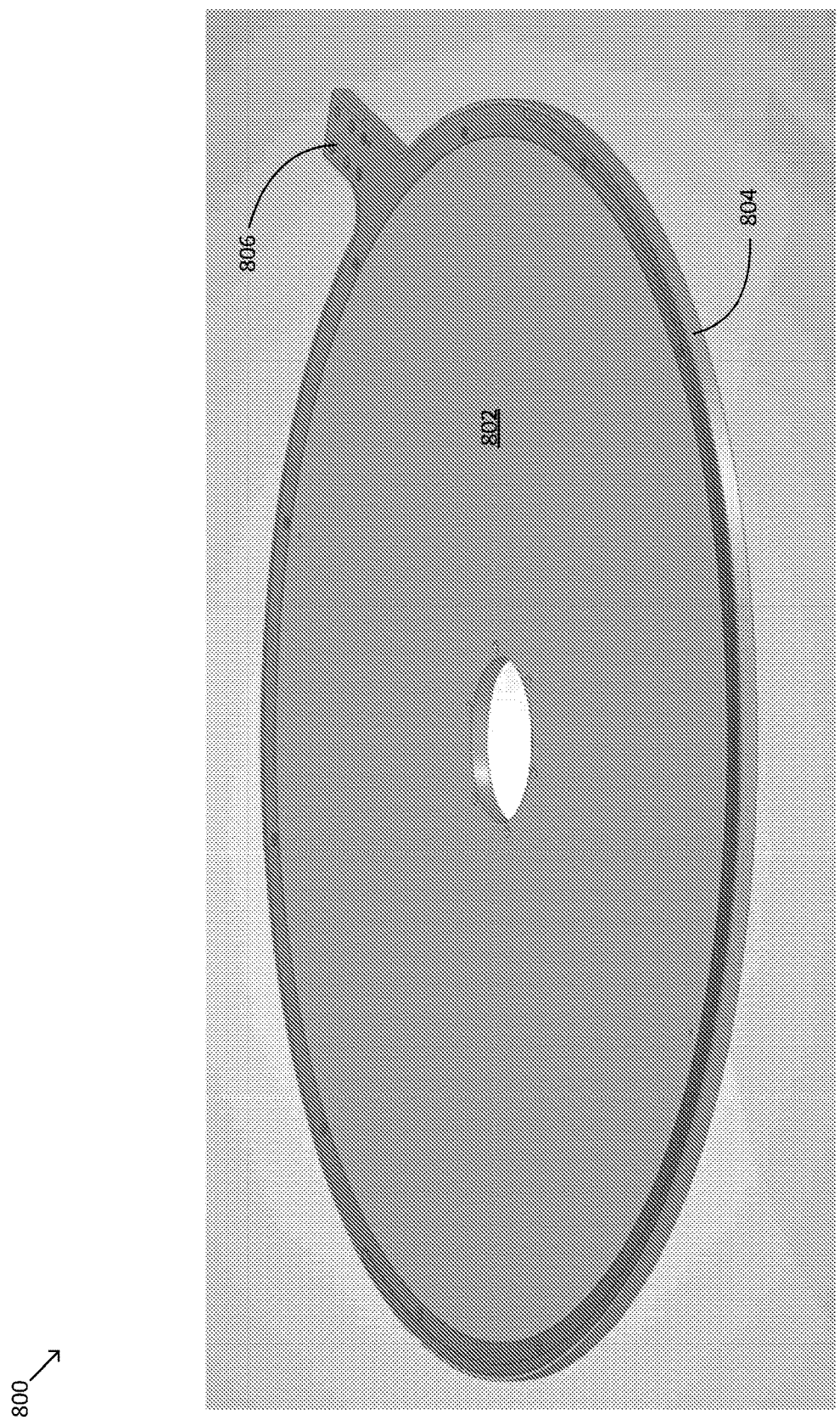
FIG. 8 shows a perspective view of a second type of pancake for stacking in the magnet assembly.

FIG. 8 shows a perspective view of a terminal pancake 800, which may be used in a magnet assembly such as magnet assembly 400 shown in FIGS. 4A-4B. The terminal pancake 800 includes a structural plate 802 and a single electrical joint 804 used to convey current into or out of the magnet assembly via an electrical conductor 806. The terminal pancake 800 is shown with its electrical joint 804 along its outside diameter. As described above, it is also contemplated to provide a terminal pancake having a single joint along its inside diameter, e.g., for use in magnet assemblies having an odd number of regular pancakes. Such alternate terminal pancakes may require an electrically conductor from the inside diameter radially outward for coupling to an external circuit, and a person of ordinary skill in the art should understand how to construct such a conductor.

Figure 9:
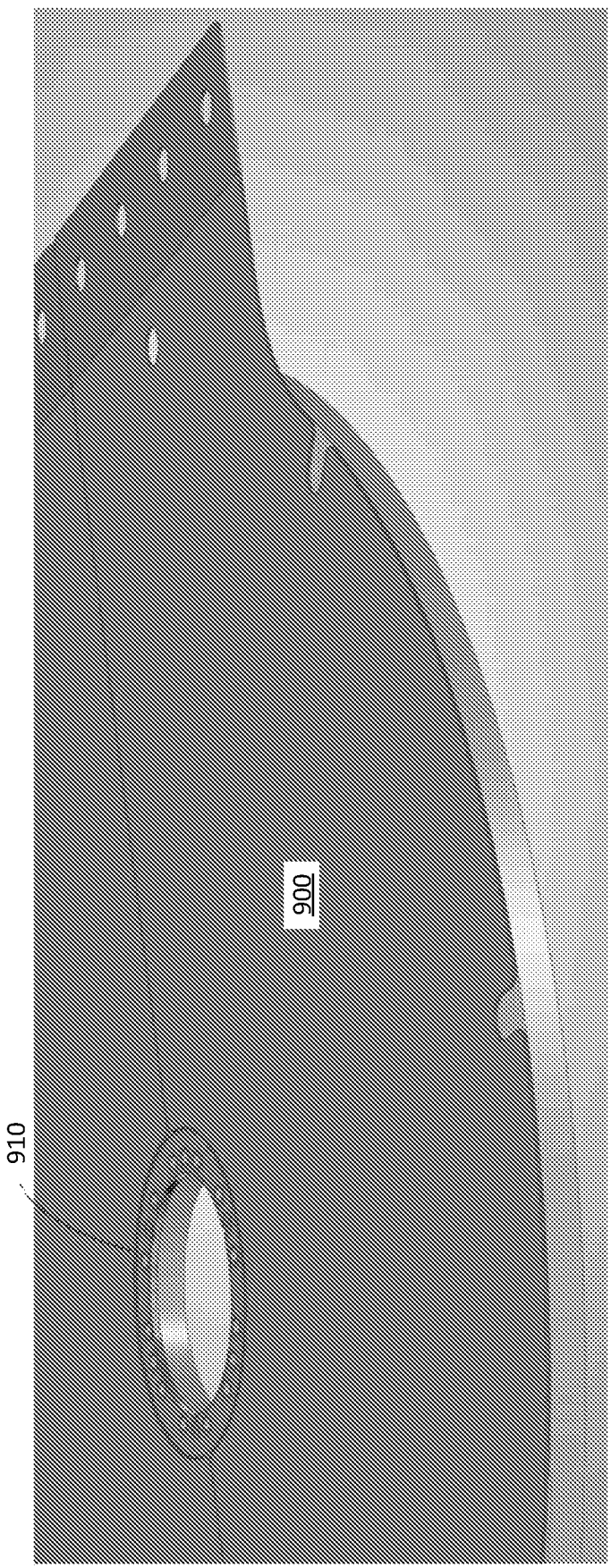
FIG. 9 shows a portion of a first cooling plate in the magnet assembly between two pancakes electrically jointed along their inside diameters.

Because the continuous pancake-to-pancake electrical path alternates along its length between the inside diameter and the outside diameter of the stack, there are two types of copper cooling plates, shaped accordingly. Thus, FIG. 9 shows a copper cooling plate 900 for use between pancakes that are mated along their inside diameters as shown by the electrical coupling interface 910, e.g., the connections between pancakes 410 and 412 at electrical coupling 444 as shown in FIG. 4B, and between the similar connections between pancakes 414 and 416, pancakes 418 and 420, and pancakes 422 and 424. In particular, a copper cooling plate 450 may be implemented as the copper cooling plate 900 of FIG. 9. It is appreciated that in designs for which a terminal pancake has a ring-shaped electrical joint along its inside diameter, where it mates with a regular pancake, the copper cooling plate 900 or plate of similar design should be used at the interface.

Figure 10:
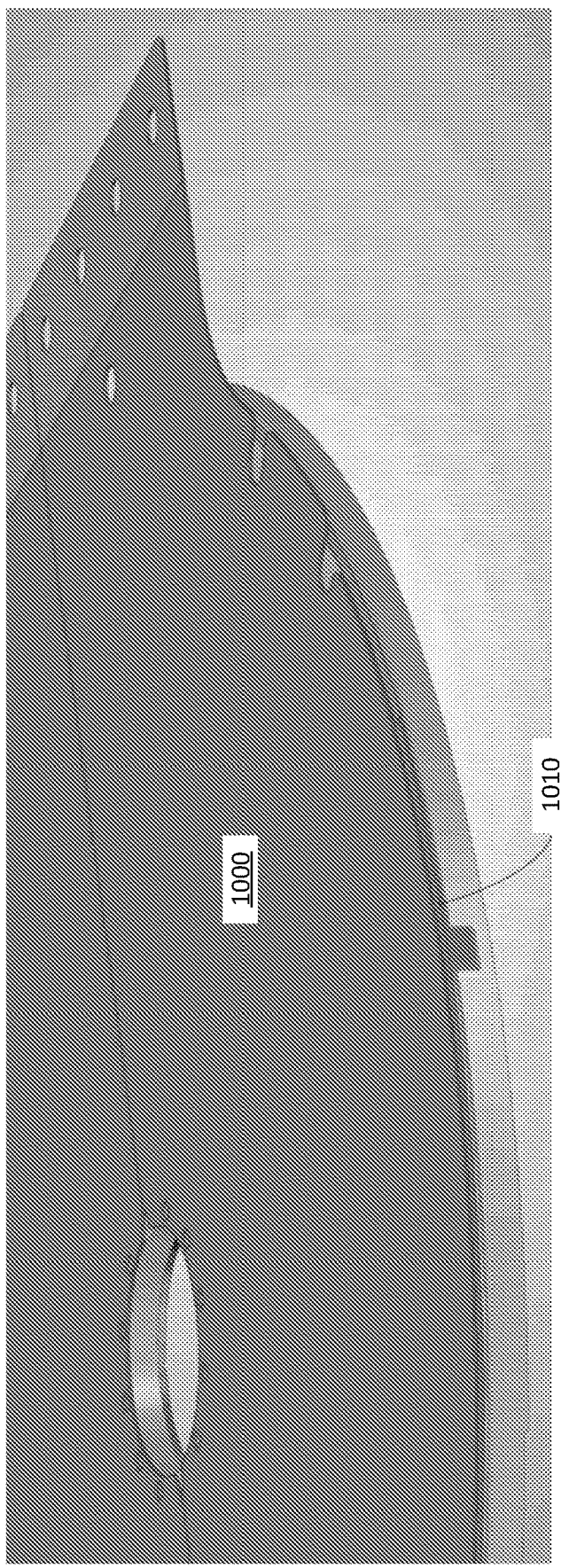
FIG. 10 shows a portion of a second cooling plate in the magnet assembly between two pancakes electrically jointed along their outside diameters.

Likewise, FIG. 10 shows a copper cooling plate 1000 for use between pancakes that are mated along their outside diameters as shown by the electrical coupling interface 1010, e.g., the connections between pancakes 412 and 414 at electrical coupling 446 as shown in FIG. 4B, and between the similar connections between pancakes 416 and 418 and between pancakes 420 and 422. In particular, the copper cooling plate 454 may be implemented as the copper cooling plate 1000 of FIG. 10. In the illustrative design of FIGS. 4A and 4B in which the terminal pancakes 430 and 432 each have a single ring-shaped joint, the copper cooling plate 1000 may be used for the couplings between pancakes 430 and 410, and between pancakes 424 and 432.

It is appreciated that in designs having an odd number of regular pancakes, one terminal pancake will have an electrical joint along its inside diameter and the other will have an electrical joint along its outside diameter. In such cases, the first terminal pancake will be adjacent to a copper cooling plate 900, while the second will be adjacent to a copper cooling plate 1000.

According to some embodiments, a thermally conductive member may be inserted between one of the pancakes and an adjacently stacked cooling plate to increase thermal conductivity when the magnet assembly is under vacuum, and to facilitate cooling of the pancakes having incorporated HTS tape. Illustratively, the thermally conductive member may be an indium foil, or a cryogenic high-vacuum grease such as APIEZON® N grease from M&I Materials Limited of Manchester, England, or a mesh of electrically conducting wire.

To complete manufacture of the magnet assembly 400 shown in FIGS. 4A-4B, regular and terminal pancakes, having a number appropriate to operational requirements, may be stacked with insulated copper cooling plates as described above, and the stack of pancakes with intermediate cooling plates may be tied together by bolts at both its inside diameter and its outside diameter. Optionally, the magnet assembly 400 incudes additional structural plates 480, 482 at the top and bottom of the stack that are bolted to each other, and the stacked plates are instead (or additionally) pressed together by these further structural plates 480, 482. At a later time, the magnet assembly 400 can be disassembled by removing the tie bolts and separating the individual pancakes. Afterward, the cold mass can be reassembled with more or fewer regular pancakes to achieve a different operating magnetic field, as needed. Thus, it is appreciated that the design of the magnet assembly 400 advantageously is both modular and conduction-cooled, having easy assembly and disassembly, and that the use of ten pancakes and nine cooling plates in the embodiment shown in FIGS. 4A and 4B is merely illustrative.

Thus, a magnet assembly 400 is disclosed that includes a plurality of cooling plates (of which cooling plates 450 and 454 are illustrative), each of the cooling plates having a terminal (e.g., terminal 452) for thermally coupling the cooling plate to a cooling apparatus 470. As shown in FIGS. 4A and 4B, the plurality of pancakes and the plurality of cooling plates are arranged in a stack in an alternating fashion, each of the pancakes in the stack being electrically coupled by its one or more conductive joints to the joints of either one or two neighboring pancakes in the stack, thereby forming an operating current path through the stack that includes the HTS tape in each of the pancakes, and each of the pancakes is adjacent to and thermally coupled to either one or two of the cooling plates.

With respect to operation of the magnet assembly 400, an operating current may be defined by the current-carrying capacity of the HTS tape stack, which is specific for the given operating temperature and maximum magnetic field on the conductor. Since the peak field varies from turn to turn, one may optionally provide HTS tape stack grading by varying the number of tapes in the stack. This helps to reduce the total amount of tape in the magnet assembly 400. By way of explanation, the HTS tape critical current is lower at the inside diameter (ID) than the outside diameter (OD) since the field is higher at the ID and is lower at the OD. To compensate for that difference, more tape is required at the ID; i.e. the HTS tape stack is "graded". This is accomplished by starting the winding at the ID with the maximum required number of tapes, then terminating some of the tapes at given radial positions, which may be done in the process of winding as described above. Note that this simplified explanation does not account for critical current dependence on the direction of the field with respect to the tape surface, but suffices for this disclosure.

There are several nominal modes of operating the magnet assembly 400: charging, steady-state, slow and fast discharge, as well as uncontrolled quench. Each of these modes is now described.

Charging and slow discharging modes are conducted by ramping transport current, controlled by an external power supply (not shown). Different from traditional magnets wound of an insulated cable, charging of no-insulation magnets takes much longer and is driven by inductive voltage-driven, turn-to-turn current sharing and consequent heating. The faster the charging rate, dI/dt, the stronger these radial currents are, and the more resistive heating power deposited into the structure must be removed by conduction cooling to avoid temperature rise of the cold mass structure and HTS tape. To expedite charging, in this magnet assembly 400 the charging rate may be controlled and dynamically adjusted to keep the temperature, measured at the warmest location (i.e. most distant from the source of cooling), at the highest acceptable value. The highest acceptable temperature is defined by proximity of the transport current to the critical current for a current combination of peak field and temperature.

Heat losses at the steady-state mode, operation at a given constant current, are much smaller and are easily managed by the available cooling power of the source of cooling, described in connection with FIGS. 11A and 11B.

Fast discharge is used to drive the current and the field in the magnet assembly 400 to zero in an emergency situation. It is accomplished by opening the current supply circuit. This operation triggers strong inductive eddy currents in the radially outermost turns of the axially outermost pancakes, tending to conserve magnetic flux in the magnet assembly 400. Outside diameter joints 402 create a convenient circumferential path for these currents, and facilitate practically uniform heating along the edge of the winding. This heat wave propagates radially deeper into the magnet assembly 400, quenching HTS tape turns one by one until the whole pancake is quenched. At this time, a large fraction of the transport current changes its path from azimuthally along the spiral HTS tape winding to radially via the more resistive path comprising the structural plates and the substrate of the HTS tape itself (which may be, for example, a corrosion-resistant alloy such as a HASTELLOY® nickel-based alloy from Haynes International, Inc. of Kokomo, Indiana). The lost magnetic flux of the quenched pancake is picked up by the next pancake and triggers a similar process in it. This process continues until all pancakes are quenched and all conserved electromagnetic energy is deposited in the cold mass in the form of heat.

An advantage of this method of quenching the magnet is that the quench is initiated and propagates in a predictable, rather uniform way and does not form local overheated spots. This is primarily accomplished due to the joints forming a path for the induced currents. Quench time depends on the size of the magnet assembly 400, and is expected to be rather fast, less than a second. This is different from the insulated magnets known in the art, which are quenched by dumping current through external resistors. In that case, quench time is defined by the terminal voltage and is usually much longer. A significant feature of the quench in no-insulation magnets is the low voltage, of the order 1 V or less, developed between the components comprising the magnet. This feature significantly reduces requirements to the insulation and permits using the above-mentioned insulating schemes.

An uncontrolled quench usually happens by formation of a quench initiation zone locally, where for some reason transport current exceeds the critical current. In non-insulated magnets, including the present design, this situation locally radially redistributes a fraction of the in-line winding current, thus changing the magnetic flux distribution and creating conditions similar to those described above for the emergency shut down by a controlled quench. Copper cladding in the form of copper joints serve the same purpose, and lead in the present design to a more controlled quench propagation resulting in a more uniform joule heating. Alternately, in the presence of an abundance of cooling power, the normally-conducting zone can recover to the superconducting state.

According to some embodiments, the cold mass of the magnet assembly may be surrounded with insulating vacuum and encapsulated into a cryostat, with a thermal radiation shield inserted between the cryostat walls and the cold mass. Conduction cooling can be accomplished by means of cryocoolers, cryorefrigerators, heat exchangers utilizing continuous flow of cryogenic liquids or in other conventionally used ways. In general, however, the cooling apparatus acts as a heat sink for thermal energy generated in the cold mass. Moreover, the cooling apparatus provides cooling of the cold mass of the magnet to the operating temperature, as well as its thermal insulation, facilitates charging/discharging of the magnet assembly and physically supports the magnet assembly during operation and, if needed, transportation.

Figure 11A:
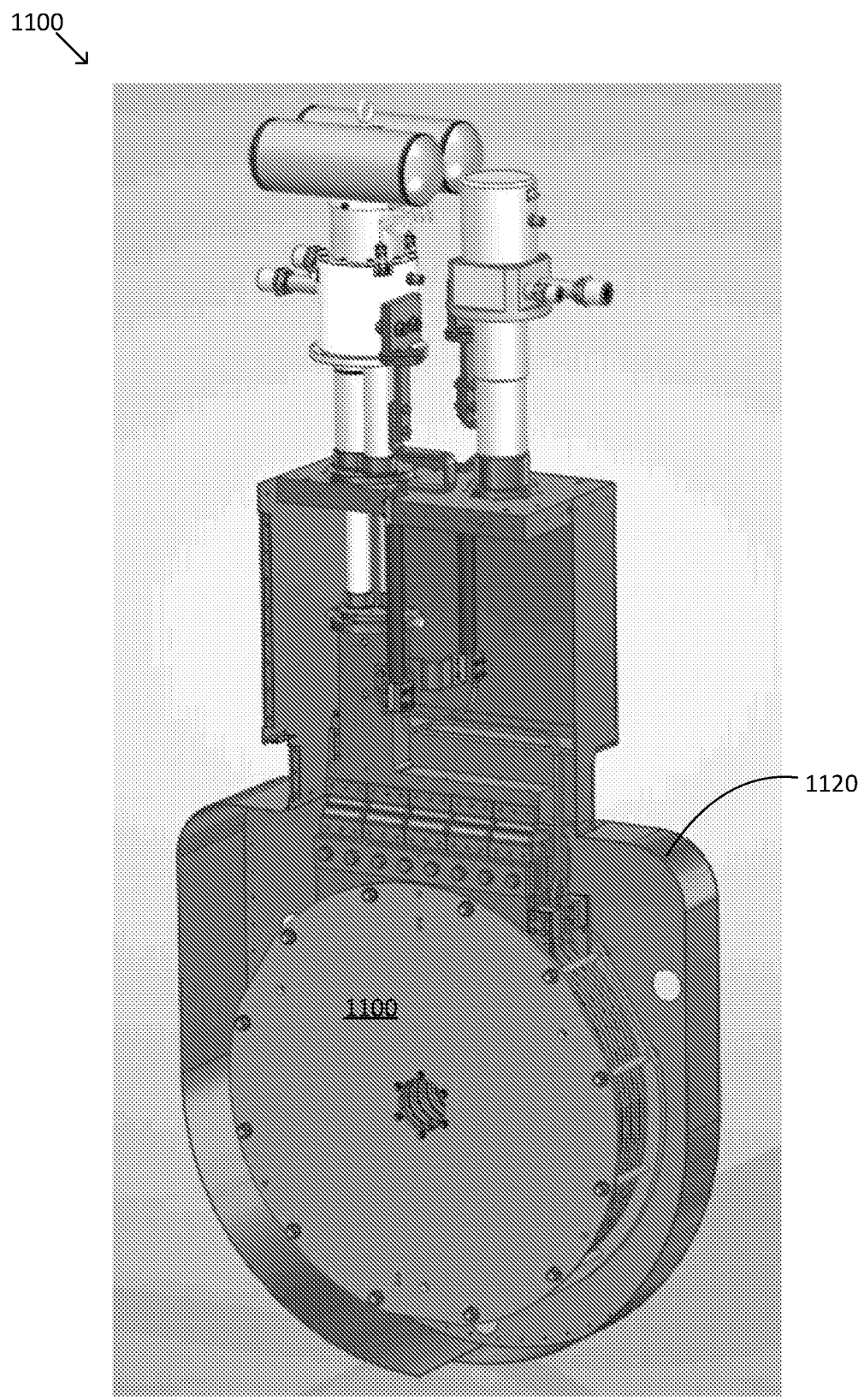
FIG. 11A shows a cut-away view of the magnet assembly coupled to a cooling apparatus.
Figure 11B:
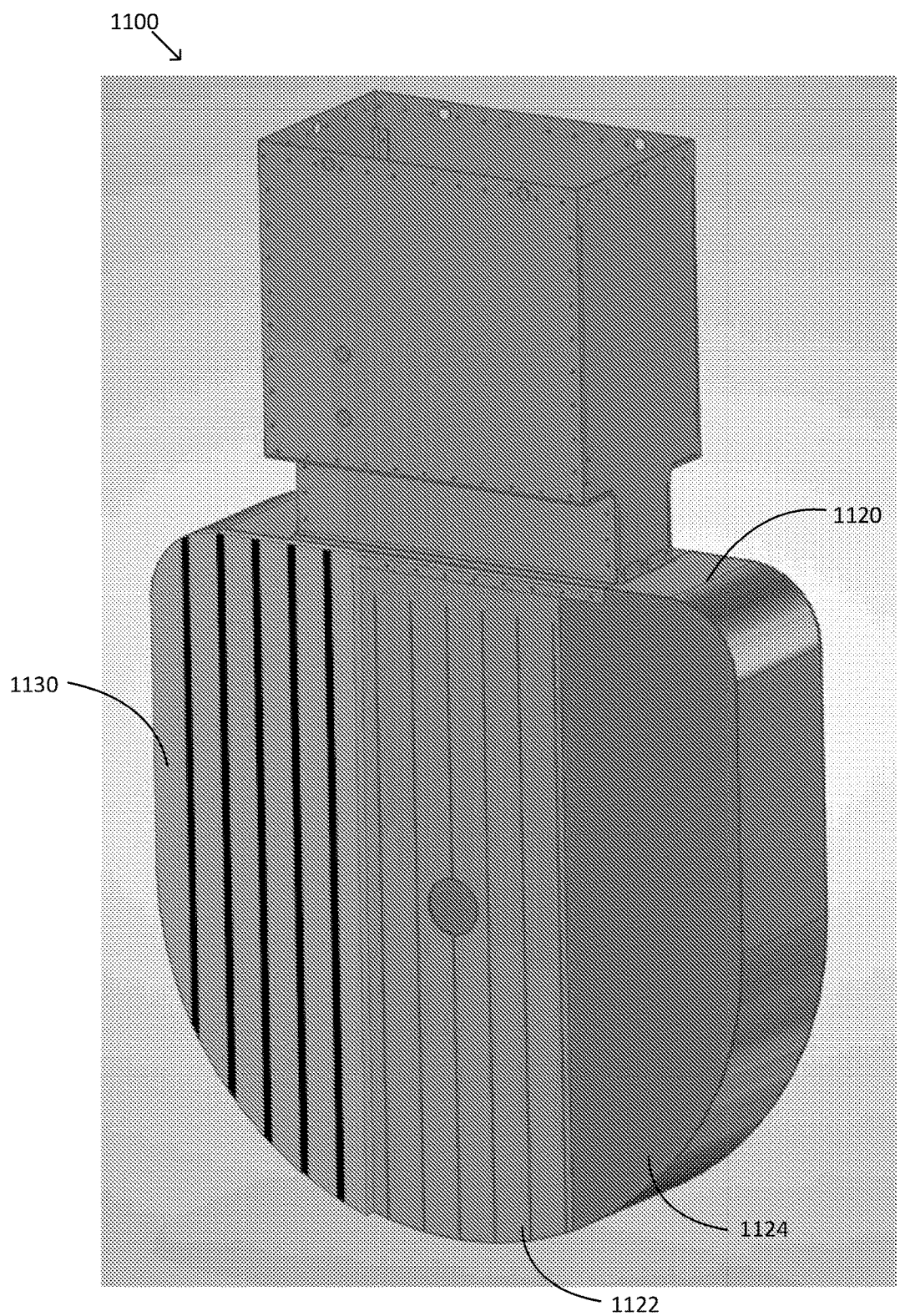
FIG. 11B shows a portion of the cooling apparatus with emphasis on thermal protective radiation shield and multilayer insulation surrounding the magnet assembly.

In this connection, FIG. 11A shows a cut-away view of a magnet assembly 1100 coupled to a portion of a cooling apparatus 1110, while FIG. 11B shows the portion 1110 with emphasis on different layers of thermal protection surrounding the magnet assembly 1100. The magnet assembly 1100 may be, for example, the magnet assembly 400 of FIGS. 4A and 4B.

Thermal insulation is provided in several forms. The first form includes pumping out the cryostat to an insulating vacuum, which may for instance be a pressure below $10^{-4}$ Torr. The second form includes installing, around the cold mass, a thermal radiation shield 1120 cooled to some intermediate temperature between the cryostat wall temperature and the cold mass temperature. The third form includes wrapping the cold mass and the radiation shield 1120 with a multilayer insulation (MLI) 1130 shown in more detail in FIG. 11B.

The radiation shield 1120 surrounding the magnet assembly 1100 and all cold mass includes thermally conductive metals, usually copper, which is in a good thermal contact with an intermediate temperature source of cooling. This source of cooling can be a separate cryocooler, or the first stage of the cryocooler cooling the magnet, or any other source of necessary temperature and cooling power such as liquid nitrogen or cryogenic gases from cryorefrigerators, or any combination thereof.

Depending on the fringing magnetic field at the location of the radiation shield 1120 and speed of changing the field during a magnet quench, the radiation shield 1120 can have a portion 1122 having cuts for electrical insulation to limit eddy currents in the material of the shield 1120 and to limit interacting Lorentz forces between a quenching magnet and the shield 1120. Such forces could deform or even destroy the radiation shield 1120. The thermoconductive material of the shield 1120 can be reinforced by a strong metal or nonmetal structure for the same reason.

Very fast, in less than a second, quench developing time is specific to the non-insulated coils disclosed herein. During this time, the coil current and high magnetic field produced by this current changes from its operating value to zero. These changes can result in strong Lorentz forces in the radiation shield 1120, so strong that usual measures like those mentioned above are not enough to protect integrity of the shield 1120 during the quench.

Referring now to FIG. 11B, to reduce and limit eddy currents and the forces acting on the radiation shield 1120 in the disclosed cooling apparatus, the conductive material of the radiation shield 1120 (e.g., copper) is cut into narrow strips in at least a portion 1122. The size of these strips is determined by allowable forces for the structure of the shield 1120. The strips in the portion 1122 are electrically insulated from each other. Illustratively, the strips may be implemented as 10 mm wide copper strips with 0.5-1.0 mm insulating gap between them. The strips are bonded to an underlying shield structure 1124, which can be made of non-electro-conducting material, like fiberglass Gil-CR. Alternately, if the forces developed during the quench permit, the underlying shield structure 1124 may be made of low electrical conductivity but strong metals, like stainless steel.

Bonding of copper strips in portion 1122 to the structural body 1124 of the shield 1120 can be provided by gluing, riveting, or by screws. Electrical insulation film can be used to insulate copper strips from a stainless steel body, if present. Any strips attached to the radiation shield 1120 in parallel to the plane of the top and bottom surfaces of the magnet assembly 1100 need to be bonded to the outer surface of the shield structure. At this location during a quench, the strips will be pressed into the shield structure, toward the magnet assembly 1100.

At least a portion of the radiation shield 1120 is located at a distance from the magnet assembly 1100, where the level of magnetic field permits usual design of the shield (i.e., not cut by strips). The thermally conductive copper strips are bonded to the thermally conductive parts of the shield with shims of indium or application of APIEZON® N grease to reduce thermal resistance of joints in the surrounding vacuum.

As a variant, the radiation shield 1120 can be made as a fiberglass dashboard with imprinted copper strips of necessary shape. The same circuit board can be used for tracing instrumentation wires.

In some embodiments, the radiation shield 1120 is wrapped with multilayer insulation (MLI) 1130 to reduce temperature and heat load to the shield due to heat transfer from the warm cryostat walls. MLI 1130 is used for thermal insulation with a vacuum environment at the vacuum pressure of $10^{-5}$ to $10^{-7}$ Torr for a good thermal performance of the cryostat. MLI 1130 consists of alternating layers of a low-emissivity radiation shield and a low thermal conductivity spacer material. The most commonly used low-emissivity radiation shield is a Mylar® substrate with a vacuum deposited aluminum coating on a single or on both sides of the sheet. The spacer material can vary; most commonly it is polyester. The blanket of MLI 1130 may consist of many layers, for instance 32 layers; in many cases two blankets are used for a better insulation of the shield.

The thickness of the deposited aluminum is very small, for instance 350 Angstroms, which is $3.5*10^{-5}$ mm. In this instance, the full thickness of aluminum in a double aluminized 32-layer blanket is 0.00224 mm. At the same time, the deposited material may be a very high purity aluminum (as that phrase is used in the published art) having a residual-resistance ratio (RRR) of approximately 1000 or higher. RRR is the ratio of the resistivity of the material at room temperature and at the cryogenic temperature, about 20 K. These properties mean that at the operating temperature 60-80 K of the radiation shield 1120, the combined effect of eddy current in the MLI blanket during the quench of the non-electrically insulated magnet can produce a significant force, applied to the radiation shield 1120, around which the blanket of MLI 1130 is wrapped. This force can damage the radiation shield and also damage the MLI 1130.

For a high-field, non-electrically insulated magnet cooling apparatus, the deposition of aluminum on the Mylar (or other material) film of the MLI 1130 is made with interruptions, which are located at different places on both sides of the aluminized film. These narrow interruptions provide a necessary electric insulation dividing the aluminized layer into strips. During the quench of the magnet, these interruptions limit eddy currents in the aluminized film and reduces Lorentz forces applied to the shield 1120 down to an allowable level. At the same time the thermal performance of the MLI 1130 is not significantly deteriorated. This is due to the very small surface area of interruptions in aluminum film and because there are no transparent places in the double aluminized film.

The above description assumes that the cold mass is cooled using a dry, conduction-cooled scheme. Alternately, the cold mass may be cooled by a cryogen-pooled scheme, in which case it is surrounded by a hermetic structural case containing a cryogenic liquid, e.g., helium, neon, argon, hydrogen. In the latter case, a person of ordinary skill in the art will understand how to modify some of the described above features to implement this change in the cooling apparatus design.

For purposes of illustration, FIG. 12 depicts a cross-sectional view of the layers of an illustrative coated-conductor HTS tape, according to some embodiments. The below description may, in some embodiments, apply to the above discussed HTS tapes arranged within a magnet or magnet assembly. Rare-earth barium copper oxide ("REBCO") is a ceramic-based HTS. Although ceramic-based HTS was first discovered in 1987, large scale production of REBCO HTS conductors was not possible until relatively recently due to the difficulty in manufacturing long strands of REBCO that still retain high performance.

FIG. 12 is an example of an HTS tape 1200 that is fabricated as a coated conductor, wherein the HTS layer 1210 is a layer of REBCO. As noted above, "REBCO" is an acronym for "rare-earth barium copper oxide." As used herein, in at least some cases "REBCO" may be used to refer more generally to any rare-earth cuprate HTS. As such, unless expressly stated otherwise, barium may be present in REBCO, but is not required to be present. Nonetheless, in the example of FIG. 12 the REBCO layer is provided as one example of an HTS layer and is not intended to limit the illustrated structure to the use of any particular HTS.

In the example of FIG. 12, the illustrative tape 1200 also includes a buffer layer 1212, a Hastelloy® layer 1214, and copper and silver layers 1216 and 1218, respectively, which are arranged both above and below the REBCO layer. The copper layer is sometimes referred to as a "stabilizer" layer. Illustrative dimensions of the tape are shown in FIG. 12, with the tape having a width (size in the X direction) of around 2-12 mm and a thickness (size in the Y direction) of around 0.1 mm.

In some embodiments, an HTS tape may have an aspect ratio (being the ratio of the tape's width to its thickness) that is greater than or equal to 10, 20, 40, 60, 80, 100, 120 or 150. In some embodiments, the HTS tape may have an aspect ratio that is less than or equal to 150, 120, 100, 80, 60, 40, 20 or 10. Any suitable combinations of the above-referenced ranges are also possible (e.g., an aspect ratio of greater than or equal to 60 and less than or equal to 100).

In some embodiments, an HTS tape may have a thickness greater than or equal to 0.005 mm, 0.01 mm, 0.05 mm, 0.1 mm, 0.15 mm, or 0.2 mm. In some embodiments, the HTS tape may have a thickness less than or equal to 0.5 mm, 0.2 mm, 0.15 mm, 0.1 mm, 0.05 mm, or 0.01 mm. Any suitable combinations of the above-referenced ranges are also possible (e.g., a thickness of greater than or equal to 0.01 mm and less than or equal to 0.1 mm).

Figure 13:
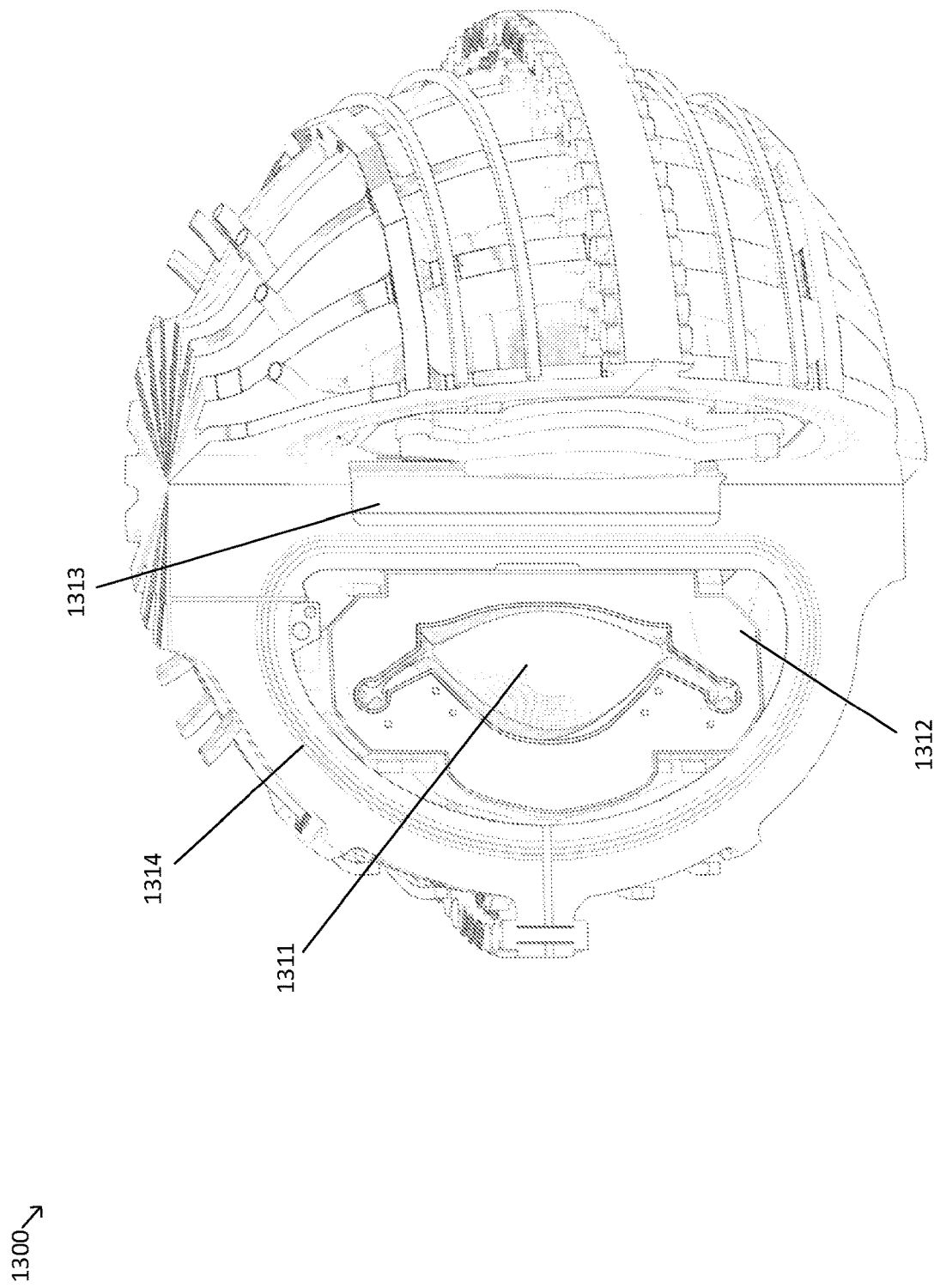
FIG. 13 is a three-dimensional graphic of a fusion power plant with a cutaway portion illustrating various components of the power plant, according to some embodiments.

FIG. 13 is a three-dimensional graphic of a fusion power plant with a cutaway portion illustrating various components of the power plant, according to some embodiments. A fusion power plant may comprise a magnet, or a magnet assembly, produced as described above. FIG. 13 shows a cross-section through a power plant and includes a magnet coil 1314, a neutron shield 1312, and a core region 1311. According to some embodiments, the magnet coil 1314 may be, or may form part of, a toroidal field coil. In some embodiments, magnet coil 1313 may be fabricated from, or otherwise includes, a superconducting magnet produced as discussed and described above. According to some embodiments, the magnet coil 1313 may be, or may form part of a central solenoid and/or other poloidal field solenoidal coils.

Persons having ordinary skill in the art may appreciate other embodiments of the concepts, results, and techniques disclosed herein. It is appreciated that superconducting magnets configured according to the concepts and techniques described herein may be useful for a wide variety of applications. For instance, one such application is conducting nuclear magnetic resonance (NMR) research into, for example, solid state physics, physiology, or proteins. Another application is performing clinical magnetic resonance imaging (MRI) for medical scanning of an organism or a portion thereof, for which compact, high-field magnets are needed. Yet another application is high-field MRI, for which large bore solenoids are required. Still another application is for performing magnetic research in physics, chemistry, and materials science. Further applications is in magnets for particle accelerators for materials processing or interrogation; electrical power generators; medical accelerators for proton therapy, radiation therapy, and radiation generation generally; superconducting energy storage; magnetohydrodynamic (MHD) electrical generators; and material separation, such as mining, semiconductor fabrication, and recycling. It is appreciated that the above list of applications is not exhaustive, and there are further applications to which the concepts, processes, and techniques disclosed herein may be put without deviating from their scope.

As used herein the phrases "HTS materials" or "HTS superconductors" refer to superconducting materials having a critical temperature above 30° K at zero self-field.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

The above-described embodiments of the technology described herein can be implemented in any of numerous ways. Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A high temperature superconductor (HTS) magnet comprising:
   a coil comprising HTS material; a housing comprising at least a first partition having a feedthrough slit provided therein, wherein: the coil is arranged within the housing,
   the first partition of the housing is arranged to separate a first portion of the coil from a second portion of the coil such that turns of the first portion of the coil are entirely arranged within the first partition and turns of the second portion of the coil are entirely arranged outside of the first partition, and the first partition is movable prior to winding the coil such that the feedthrough slit in the first partition is arranged at a position at which the HTS material of the coil may pass through the feedthrough slit in the first partition.

2. The magnet of claim 1, wherein the housing comprises a first structural plate and a second structural plate, wherein the coil is arranged between the first and second structural plates, and wherein the first partition comprises a wall extending between the first and second structural plates.

3. The magnet of claim 2, wherein the first structural plate comprises a first slot, and wherein the first partition is arranged within the first slot.

4. The magnet of claim 1, wherein the feedthrough slit extends through the height of the first partition.

5. The magnet of claim 1, wherein an outer dimension of the first partition is a spiral shape, and wherein the feedthrough slit of the first partition is a gap between adjacent turns of the spiral shape of the first partition.

6. The magnet of claim 1, wherein the HTS material is HTS tape.

7. The magnet of claim 6, further comprising an electrically conducting material arranged between at least some turns of the coil.

8. The magnet of claim 7, wherein the coil is formed from a plurality of layers of HTS tape and a layer of the electrically conducting material wound into a plurality of turns.

9. The magnet of claim 6, wherein the coil comprises turns of the HTS tape arranged such that turns of the HTS tape contact a face of the HTS tape in an adjacent turn.

10. The magnet of claim 1, further comprising a first conductive ring coupled to an interior end of the coil and a second conductive ring coupled to an exterior end of the coil.

11. The magnet of claim 1, wherein the housing comprises a second partition arranged exterior to the first partition and comprising a feedthrough slit through which the coil passes, wherein turns of the first portion of the coil and at least some turns of the second portion of the coil are entirely arranged within the second partition of the coil.

12. The magnet of claim 1, wherein the housing and the first partition each comprises steel, an austenitic nickel-chrome alloy, and/or a nitrogen-strengthened austenitic stainless steel.

13. A magnet assembly comprising a plurality of instances of the magnet of claim 1.

14. A high temperature superconductor (HTS) magnet comprising:
 a coil comprising HTS material;
 a housing comprising at least a first partition, wherein:
 the coil is arranged within the housing,
 the first partition of the housing is arranged to separate a first portion of the coil from a second portion of the coil such that turns of the first portion of the coil are entirely arranged within the first partition and turns of the second portion of the coil are entirely arranged outside of the first partition, and
 the first partition comprises a slit through which the coil passes;
 wherein the housing comprises a first structural plate and a second structural plate, wherein the coil is arranged between the first and second structural plates, and wherein the first partition comprises a wall extending between the first and second structural plates;
 wherein the first structural plate comprises a first circular slot, and wherein the first partition is arranged within the first circular slot; and
 wherein the first partition is removably inserted within the first circular slot and wherein the first partition is free to rotate within the first circular slot.

15. The magnet of claim 14, wherein the feedthrough slit extends through the height of the first partition.

16. The magnet of claim 14, wherein an outer dimension of the first partition is a spiral shape, and wherein the feedthrough slit of the first partition is a gap between adjacent turns of the spiral shape of the first partition.

17. The magnet of claim 14, wherein the HTS material is HTS tape.

18. The magnet of claim 17, further comprising an electrically conducting material arranged between at least some turns of the coil.

19. The magnet of claim 18, wherein the coil is formed from a plurality of layers of HTS tape and a layer of the electrically conducting material wound into a plurality of turns.

20. The magnet of claim 17, wherein the coil comprises turns of the HTS tape arranged such that turns of the HTS tape contact a face of the HTS tape in an adjacent turn.

21. The magnet of claim 14, further comprising a first conductive ring coupled to an interior end of the coil and a second conductive ring coupled to an exterior end of the coil.

22. The magnet of claim 14, wherein the housing comprises a second partition arranged exterior to the first partition and comprising a feedthrough slit through which the coil passes, wherein turns of the first portion of the coil and at least some turns of the second portion of the coil are entirely arranged within the second partition of the coil.

23. The magnet of claim 14, wherein the housing and the first partition each comprises steel, an austenitic nickel-chrome alloy, and/or a nitrogen-strengthened austenitic stainless steel.

* * * * *